US011308059B2

(12) United States Patent
Soni et al.

(10) Patent No.: US 11,308,059 B2
(45) Date of Patent: Apr. 19, 2022

(54) OPTIMIZED DATA STRUCTURE

(71) Applicant: Chicago Mercantile Exchange Inc., Chicago, IL (US)

(72) Inventors: Priteshkumar Soni, Naperville, IL (US); Sandeep Sreekumar, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 781 days.

(21) Appl. No.: 16/006,546

(22) Filed: Jun. 12, 2018

(65) Prior Publication Data

US 2019/0377810 A1 Dec. 12, 2019

(51) Int. Cl.
G06F 16/22 (2019.01)
G06F 16/23 (2019.01)
G06F 16/28 (2019.01)

(52) U.S. Cl.
CPC ...... *G06F 16/2272* (2019.01); *G06F 16/2237* (2019.01); *G06F 16/2379* (2019.01); *G06F 16/285* (2019.01)

(58) Field of Classification Search
CPC ............. G06F 16/2272; G06F 16/2237; G06F 16/2379; G06F 16/285
See application file for complete search history.

(56) References Cited

U.S. PATENT DOCUMENTS

| 5,973,698 | A | 10/1999 | Suzuki |
| 7,039,610 | B2 | 5/2006 | Morano et al. |
| 7,853,499 | B2 | 12/2010 | Czupek et al. |
| 8,612,451 | B1 | 12/2013 | Wen et al. |
| 8,627,099 | B2* | 1/2014 | Kuo ................ G06F 21/56 |
| | | | 713/188 |
| 9,189,478 | B2 | 11/2015 | Baris et al. |
| 9,654,397 | B2 | 5/2017 | Chu et al. |
| 9,817,858 | B2 | 11/2017 | Eisenreich et al. |
| 9,846,642 | B2 | 12/2017 | Choi et al. |
| 2005/0096999 | A1 | 5/2005 | Newell et al. |

(Continued)

OTHER PUBLICATIONS

European Search Report, from EP 19179589, dated Sep. 16, 2019, EP.

(Continued)

*Primary Examiner* — Mark D Featherstone
*Assistant Examiner* — Ranjit P Doraiswamy
(74) *Attorney, Agent, or Firm* — Lempia Summerfield Katz LLC

(57) ABSTRACT

A computer implemented method for storing and retrieving data elements in a computer memory comprises configuring, by a processor, the computer memory according to a data structure, the data structure including: a data element array including a plurality of sorted data elements, each data element associated with a position in the data element array; and a cluster element array including one or more cluster elements, each cluster element defined by one of one data element from the data element array or a plurality of continuous data elements from the data element array, wherein each cluster element is associated with a cluster code for determining the position of one or more data elements in the data element array, the cluster code correlating each data element defining the cluster element with the position of the data element in the data element array.

25 Claims, 21 Drawing Sheets

(56) References Cited

U.S. PATENT DOCUMENTS

| | | | |
|---|---|---|---|
| 2005/0203826 | A1 | 9/2005 | Farrell et al. |
| 2007/0294502 | A1* | 12/2007 | Gunther ................ G06F 40/146 |
| | | | 711/173 |
| 2008/0071818 | A1* | 3/2008 | Apanowicz ....... G06F 16/24542 |
| 2014/0006243 | A1 | 1/2014 | Boudreault et al. |
| 2015/0073962 | A1 | 3/2015 | Bixby et al. |
| 2015/0127513 | A1 | 5/2015 | Studnitzer et al. |
| 2015/0161727 | A1 | 6/2015 | Callaway et al. |
| 2015/0242429 | A1 | 8/2015 | Varvello et al. |
| 2015/0278493 | A1 | 10/2015 | Arning et al. |
| 2016/0359631 | A1 | 12/2016 | Nawaz et al. |
| 2017/0208073 | A1* | 7/2017 | Eleish ................. G06F 3/04883 |
| 2017/0331774 | A1 | 11/2017 | Peck-Walden et al. |
| 2018/0096247 | A1 | 4/2018 | Maruhashi |

OTHER PUBLICATIONS

"Hash Function" Wikipedia—https://en.wikipedia.org/wiki/Hash_function#Hash_function_algorithms. Accessed May 15, 2018.

"Linear Probing" Wikipedia—https://en.wikipedia.org/wiki/Linear_probing. Accessed May 15, 2018.

"Primary Clustering" Wikipedia—https://en.wikipedia.org/wiki/Primary_clustering. Accessed May 30, 2018.

"Why do Hash Tables Need to Store the Key of a Record" Quora—https://www.quora.com/why-do-has-tables-need-to-store-the-key-of-a-record. Accessed May 15, 2018.

Craig Guyer, et al. "Clustered and Nonclustered Indexes Described" Microsoft Docs (Nov. 28, 2017) 1-4.

David Sklar "Chapter 4. Groups of Data: Working with Arrays" Learning PHP (Accessed: May 18, 2018): 1-27.

* cited by examiner

OPTIMIZED DATA STRUCTURE

TECHNICAL FIELD

The present disclosure relates to a data structure which enables more efficient storage and retrieval therefrom.

BACKGROUND

A computer program can be written to store data in a field of a data structure. Additionally, the computer program can specify how data is written read from the data structure. A data structure such as an array stores elements that are indexed and identifiable by a key. When a new element is added to the array, the new element is mapped to an index in the array. The new element is identified by the key. When an element is to be retrieved (e.g., using a query), the index of the element is determined using the key for the element, and the element may then be retrieved. The data elements to be stored in the array may vary because they may be application dependent, and may be of arbitrary size, whereas the array may be specified to be of a certain size. Some systems use a hash function to map the arbitrary data to the array. The hash function may be used to map a key to an index in an array, where the index denotes the location in the hash table where the corresponding record should be stored.

Ideally, a hash function will assign each key to a unique index, but many hash functions are imperfect, i.e., more than one key may be hashed to the same index, which might cause hash collisions. A system may perform a linear probing search in response to a hash function collision, which can be a computationally expensive search. The computational expense is incurred when the data is initially stored in the hash table, and is incurred again when the data is retrieved. Linear probing is a function used to both identify available space to store a data element when the hash function results in a collision, i.e., the location for storing the data identified by the hash function is already occupied, as well as find that data later for retrieval.

Many applications in high speed data transaction processing systems require low latency and consistent, predictable performance. Data structures that use linear searches or probing hashmaps can cause a high degree of variability and unpredictably for applications. For example, an exchange computing system may provide a platform for electronic trading, where traders submit orders (as part of electronic data transaction request messages) that are then processed by the exchange computing system. The orders may be associated with order identifiers ("ID"). Traders may thereafter retrieve and/or modify (delete, cancel) previous orders, and may rely on order IDs to perform functions. Because the data transaction processing system needs to access the order IDs, the order IDs may be stored in a data structure, e.g., an array. The data transaction processing system may need to quickly access elements of the array (the order IDs, and/or order information associated with a particular order ID), where any delays in such access (e.g., such as those caused due to the data structures in use) may cause a delay or bottleneck in the data transaction processing system applications.

Data structures such as arrays are often used to store elements of the same data type, e.g., an integer or a string. Accordingly, elements stored in a data structure often have one or more characteristics in common. It would be desirable to have a mechanism that speeds up or otherwise improves the lookup/edit operation for specific data types.

DETAILED DESCRIPTION

Figure 1:
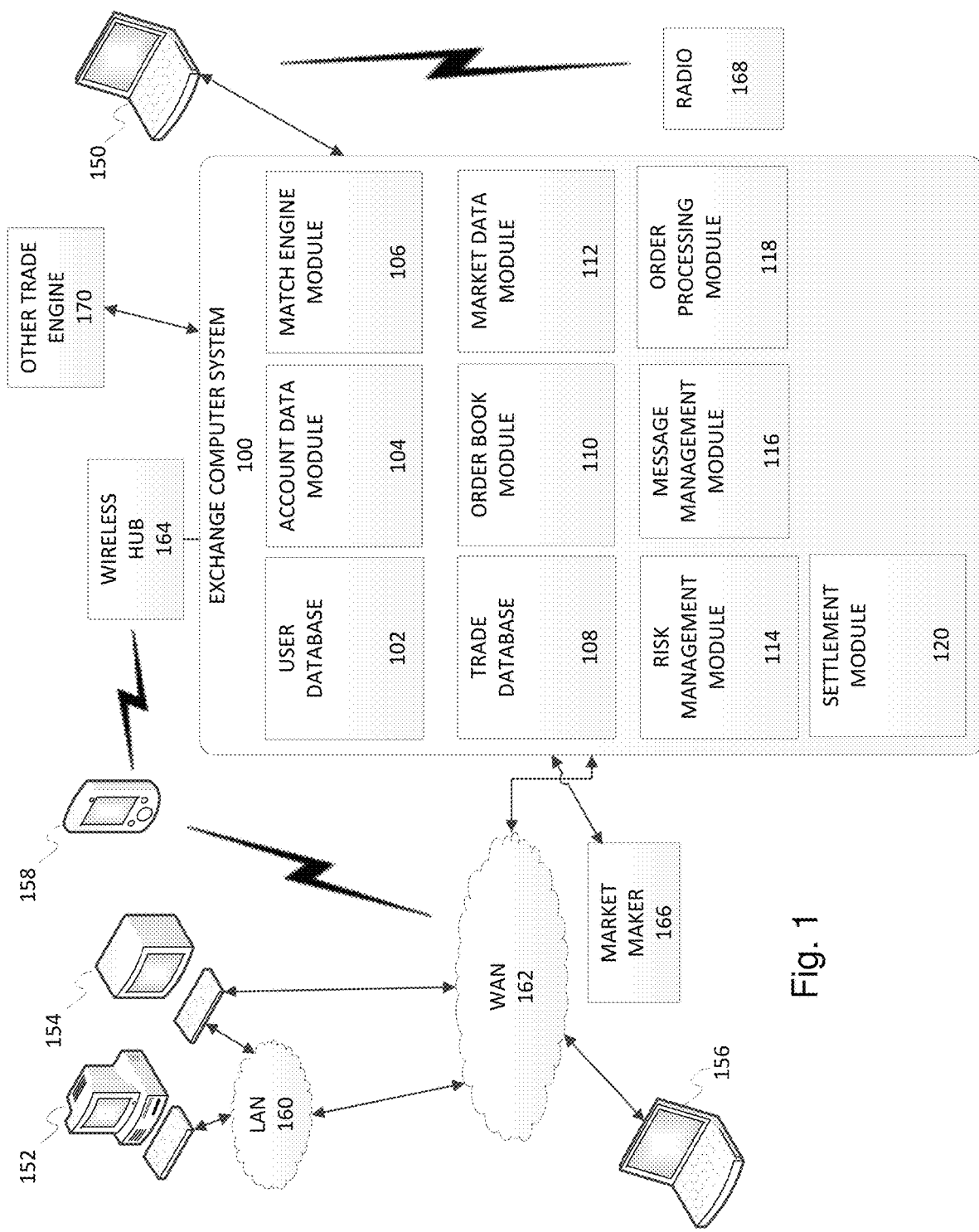
FIG. 1 depicts a computer network system, according to some embodiments.

The disclosed embodiments relate generally to systems and methods for efficient storage and retrieval of key values in a data structure, and more specifically to systems and methods for implementing a novel data structure that provides a constant or near-constant element insertion time, thereby removing insertion time variance and improving application predictability. The disclosed systems and methods also greatly reduce the variability, and thus improve the predictability, of performing data lookups by storing continuous elements in clusters until threshold conditions are met, at which time the elements in the data structure may be reclustered. Reclustering may involve redefining the clusters in the cluster array, and/or adding new clusters. Reclustering may also involve parsing through the data structure to eliminate voids in the data structure, and/or copying the data elements into a new data structure. Reclustering may typically result in a larger number of clusters, but a reduction in size of the clusters (i.e., the number of cluster elements defining a cluster). The disclosed embodiments may be configured to minimize how often/when reclustering occurs based on the threshold conditions. By minimizing reclustering of data, the disclosed embodiments provide a data structure configured to store large clusters of continuous elements which speeds up data insertions and lookup. The data clusters may contains gaps in the data structure from where elements have been deleted, but these gaps may not be reclaimed (e.g., as free memory) by the data structure until the reclustering. The disclosed embodiments eliminate collisions at the time of data insertion as well as at the time of data retrieval, resulting in a more efficient data structure which may be tailored for particular (e.g., ever increasing, and/or incremental) data types. Data structures may include, without limitation, arrays, queues, protocol buffers, primitive data structures, abstract data structures, composite data structures, linear data structures, lists, linked lists, binary trees, graphs, maps, tables, objects, and/or other structures sufficient to hold identifying information of allocated memory.

The disclosed embodiments include a data structure that allows for rapid insertion and retrieval of data elements, and also reduces computing resources necessary to access (e.g., read or delete) the data elements. Unlike existing solutions for data storage in an array or similar data structure, the disclosed embodiments avoid hashing of keys, which can result in data collisions that requires time and computational resources to overcome (e.g., by performing a linear probe).

In many cases, the disclosed embodiments guarantee a constant data insertion time. Data access time (either for reading data or for deleting data) may also be constant, depending on how the data structure clusters elements as discussed below. The worst case performance for data access may still be optimized/improved over existing systems, because the time/computational expense of looking up/deleting any of the keys stored in the data structure becomes a function of the number of clusters, and not a function of the number of data elements stored in the array. In cases where the number of data elements is large, but many of the data elements are continuous, the disclosed clustering data structure minimizes the computational expense of retrieving the data elements, e.g., when compared to a data structure whose retrieval time is based on the number of data elements. Accordingly, the latency associated with data access/retrieval is also reduced. The disclosure accordingly provides technical improvements in the field of data storage and retrieval of a specific type of data (a data set having specific characteristics, e.g., large sets of continuous, ever-increasing data elements).

The disclosed embodiments may be implemented in association with a data transaction processing system that processes data items or objects, such as an exchange computing system. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a specified price. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value.

The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. Input electronic data transaction request messages may be received from different client computers over a data communication network, and output electronic data transaction result messages may be transmitted to the client computers and may be indicative of results of the attempts to match incoming electronic data transaction request messages. The specifically configured matching processors may additionally generate information indicative of a state of an environment (e.g., the state of the order book) based on the processing of the electronic data transaction request messages, and report this information to data recipient computing systems via outbound messages published via one or more data feeds that contain electronic data transaction result messages. While the disclosed embodiments may be described with respect to electronic data transaction request and result messages, it will be appreciated that the disclosed embodiments may be implemented with respect to other technologies later developed, such as photonic, e.g., light-based, messages.

For example, one exemplary environment where the disclosed embodiments may be desirable is in financial markets, and in particular, electronic financial exchanges, such as a futures exchange, such as the Chicago Mercantile Exchange Inc. (CME).

I. Exchange Computing System

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

Electronic messages such as incoming messages from market participants, i.e., "outright" messages, e.g., trade order messages, etc., are sent from client devices associated with market participants, or their representatives, to an electronic trading or market system.

II. Electronic Data Transaction Request/Result Messages

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages, or electronic data transaction result messages, may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order, or an electronic data transaction result message. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. Patent Publication No. 2017/0331774, filed on May 16, 2016, entitled "Systems and Methods for Consolidating Multiple Feed Data", assigned to the assignee of the present application, the entirety of which is incorporated by reference herein and relied upon.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order or Per Order, Market Depth (also known as Market by Price or Aggregated By Value to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, also known as an Aggregated By Value ("ABV") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed also known as a Per Order ("PO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO/PO messages may carry much more data than MBP/ABV messages because MBO/PO messages reflect information about each order, whereas MBP/ABV messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An ABV book data object may include information about multiple values. The ABV book data object may be arranged and structured so that information about each value is aggregated together. Thus, for a given value V, the ABV book data object may aggregate all the information by value, such as for example, the number of orders having a certain position at value V, the quantity of total orders resting at value V, etc. Thus, the value field may be the key, or may be a unique field, within an ABV book data object. In one embodiment, the value for each entry within the ABV book data object is different. In one embodiment, information in an ABV book data object is presented in a manner such that the value field is the most granular field of information.

A PO book data object may include information about multiple orders. The PO book data object may be arranged and structured so that information about each order is represented. Thus, for a given order O, the PO book data object may provide all of the information for order O. Thus, the order field may be the key, or may be a unique field, within a PO book data object. In one embodiment, the order ID for each entry within the PO book data object is different.

In one embodiment, information in a PO book data object is presented in a manner such that the order field is the most granular field of information.

Thus, the PO book data object may include data about unique orders, e.g., all unique resting orders for a product, and the ABV book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP/ABV and MBO/PO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate a PO book object and an ABV book object. It should be appreciated that each book object, or view for a product or market, may be derived from the Per Order book object, which includes all the orders for a given financial product or market.

An inbound message may include an order that affects the PO book object, the ABV book object, or both. An outbound message may include data from one or more of the structures within the exchange computing system, e.g., the PO book object queues or the ABV book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. Patent Publication No. 2015/0161727, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

The disclosed embodiments may be applicable to the use of either an MBP market data feed and/or an MBO market data feed.

III. Market Segment Gateway

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple markets, and because the electronic trading system includes one MSG for each market/product implemented thereby, the electronic trading system may include multiple MSGs. For more detail on deterministic operation in a trading system, see U.S. Patent Publication No. 2015/0127513 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013 ("the '513

Publication"), the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which determinism may be applied, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described.

As described above, as used herein a business transaction may be defined as one or more operations or acts which are undertaken according to one or more associated business rules (including industry, legal or regulatory requirements or customs) to accomplish a business or commercial purpose, which may include compliance with industry, regulatory or legal requirements. A business transaction may be implemented by one or more computer processing and/or database operations/program steps, which themselves may be referred to as transactions. Business transactions, as defined by the associated business rules, may be characterized as deterministic in that they be characterized by an interdependency or relationship which affects their result, such as a dependency on the order in which they are processed, such as a temporal order, and/or a dependency on real time processing, as defined by business rules, so as to effect the business/commercial purpose and/or meet participant expectations, referred to herein as "transactional determinism." Generally, a set of deterministic transactions will provide a particular result when executed in one order and a different result when executed in a different order. In some applications, deterministic processing may be preferred/prioritized over real time processing.

For example, wherein the business rules define a first-in-first-out ("FIFO") process for matching offers with counter-offers to effect an exchange or trade, when an offer transaction is received to which no prior counter offer transaction has been previously received, it should be matched with the next suitable counter offer transaction received rather than a later received counter offer transactions. It will be appreciated that the processing of a given transaction may involve delaying further processing of that transaction in favor of a later received transaction, such as dependent upon conditions specified by the earlier transaction and/or the defined business rules. It will further be appreciated that, at a minimum, any representation of the current state of a business environment, e.g. market, or changes thereto, in which the business transactions are transacted should present an accurate reflection of the actual state or state change in accordance with the defined business rules, so as to not mislead participants or provide an unfair advantage. In the disclosed embodiments, the phrase "financial transaction" will refer to a business transaction involving the purchase or sale of financial instruments, such as futures contracts or options thereon, spread or other combination contracts and the like, as will be described. As was described above, electronic trading systems generally define their business rules and then must ensure transactional determinism in compliance therewith.

Generally, when the rate of business transaction processing is less than the underlying instructions processing capacity of the underlying general purpose processor, general performance optimizations implemented by the processor or operating system may be hidden or otherwise imperceptible at the transactional level. That is, the processor is able to perform these optimizations (e.g. page switches, instruction pre fetch, branch mis-predictions, cache miss processing, error/packet recovery) fast enough so as not to affect the executing business application. However, as the rate and volume of transactions increases, contention for internal processor resources, such as memory bandwidth, also increases. Accordingly, the impact of internal optimizations on the executing application may no longer be imperceptible. In a multiprocessor environment, this impact may affect the ability to maintain application tasks/processes, which are divided among multiple processors, in sync which each other which may result in out of order execution of one or more transactions.

In the exemplary embodiments, all transactions are ultimately received at the electronic trading system via a single point of entry, i.e. a single communications interface, at which the disclosed embodiments apply determinism, which as described is moved away from the point where matching occurs and closer to the point where the electronic trading system first becomes "aware" of the incoming transaction. This may require improving the performance of this communications interface to process the influx of transactions without being overwhelmed. In some implementations, more orders may be submitted by market participants via more parallel inputs/channels/communications pathways implemented to increase capacity and/or reduce resource contention. However, for many of the reasons described above, parallel communication paths complicate deterministic behavior, e.g. by creating opportunity, such a via asymmetric delays among communications paths, for later transmitted or arriving transactions to overtake earlier arriving or transmitted transactions, and may require mechanisms to discriminate among closely received transactions and arbitrate among simultaneously, or substantially simultaneously, received transactions, e.g. transactions received at the same time or received within a threshold of time unresolvable by the system. Accordingly, mechanisms may be implemented to improve and impart deterministic handling of discrimination and arbitration among closely received transactions.

As was described above, to gain and maintain the trust and confidence of market participants and encourage participation, electronic trading systems ideally attempt to offer a more efficient, fair and balanced market where market prices reflect a true consensus of the value of traded products among the market participants, and which minimize, if not eliminate, surreptitious or overt subversion, influence of, or manipulation by, any one or more market participants, intentional or otherwise, and unfair or inequitable advantages, with respect to access to information or opportunities. To accomplish these goals, for example, electronic trading systems should operate in a deterministic, i.e. a causal, predictable, or otherwise expected, manner as understood and experienced by the market participants, i.e. the customers of the Exchange. Electronic trading systems which implement markets which are overtly or covertly inefficient, unfair or inequitable risk not only losing the trust, along with the patronage, of market participants, but also increased regulatory scrutiny as well as potential criminal and/or civil liability.

Accordingly, as described, the operators of electronic trading systems, alone or in conjunction with, or at the direction of, regulatory or industry organizations, typically publish or otherwise promulgate rules or regulations, referred to as business or operating rules, which govern the operation of the system. These rules define how, for example, multiple transactions are processed by the system where those transactions have relationships or dependencies there between which may affect the result of such processing. Such business rules may include, for example, order allocation rules, i.e. rules which dictate which of multiple competing resting orders will be matched with a particular incoming order counter thereto having insufficient quantity to fill all of the suitable resting orders. For example, under a first-in-first-out methodology, the first order, of the competing resting orders, that was received by the electronic trading system will be matched with the incoming counter-order and filled to the extent possible by the available quantity, with any residual quantity of the incoming counter order then being allocated to the next received suitable competing resting order and so on until the available quantity of the incoming counter order is exhausted. However, additional or alternative matching/allocation rules may be implemented as well, for example to ensure fair and equal access, improve trading opportunities, etc., by allocating, such as proportionally, the available quantity of the incoming counter order among all, or a subset, of the competing resting orders until the available quantity is exhausted.

Once such business rules are established, or modified, market participants will expect, and overseeing regulatory entities may require, that the electronic trading system operate in accordance therewith. That is, if the Exchange adopts a rule to give first arriving orders priority over later arriving orders, a market participant who submits an earlier arriving order will expect their order to be filled prior to a later arriving order submitted by another market participant. It will be appreciated that these rules, by which operators of an electronic trading system may choose to operate their system, may vary at the discretion of the operators, subject to regulatory concerns. Generally, the term "transactional determinism" may refer to the processing, or the appearance thereof, of orders in accordance with the defined business rules.

In addition to efficiency, fairness and equity, electronic trading systems further provide significant performance improvements allowing for rapid high volume transaction processing which benefits both the Exchange and market participants. Metrics of electronic trading system performance include latency and throughput. Latency may be measured as the response time of the Exchange. This can be measured in a number of different contexts: the time elapsed from when an order, or order cancelation, is received to when a confirmation/acknowledgment of receipt is transmitted, from when an order is received to when an execution notification is transmitted, or the time elapsed from when an order is received to information about that order being disseminated in the market data feed. Throughput may be measured as the maximum number of orders or trades per second that the electronic trading system can support, i.e. receive and acknowledge, receive and match, etc.

Generally, market participants desire rapid market data updates, low latency/high throughput order processing, and prompt confirmations of their instructions to allow them to: competitively, frequently and confidently evaluate, react to, and capitalize upon or, conversely, avoid, discrete, finite, fast moving/changing or ephemeral market events; leverage low return transactions via a high volume thereof; and/or otherwise coordinate, or synchronize their trading activities with other related concerns or activities, with less uncertainty with respect to their order status. Higher volume capacity and transaction processing performance provides these benefits as well as, without detrimentally affecting that capacity or performance, further improves market access and market liquidity, such as by allowing for participation by more market participants, the provision of additional financial products, and/or additional markets therefore, to meet the varying needs of the market participants, and rapid identification of additional explicit and implicit intra- and inter-market trading opportunities. The Exchange benefits, for example, from the increased transaction volume from which revenue is derived, e.g. via transaction fees.

Current electronic trading systems already offer significant performance advantages. However, increasing transaction volumes from an increasing number of market participants, implementation by some market participants of algorithmic and/or high frequency trading methodologies whereby high speed computers automatically monitor markets and react, usually in an overwhelming manner, to events, coupled with a continued demand for ever-decreasing processing latencies and response times, is driving a need for additional capacity and performance improvements to maintain performance as experienced by each market participant and avoid detrimental consequences, such as capacity exhaustion and inequitable access. For example, the increasing speed at which market participants may evaluate and respond to changes in market data, such as responsive to a market event, is increasing the rate at which transactions are received by the electronic trading system, narrowing the time of receipt gap there between and necessitating a need for a higher degree of discrimination so as to resolve the order in which those transactions are received, upon which the deterministic operation of the electronic trading system may be based, e.g. for order allocation, etc. Furthermore, the addition, by electronic trading systems, of additional channels of communication in an effort to increase capacity and opportunity, along with increased bandwidth of each channel, allows for more transactions to be submitted over multiple parallel paths into the system. Accordingly, not only must the electronic trading system discriminate among closely received incoming transactions, but must further arbitrate among transactions received simultaneously, or temporally so close together as to be considered simultaneously received, i.e. the difference in their time of receipt being too close to measure by the implemented discrimination mechanisms, also referred to as "substantially simultaneously".

In addition to increased capacity and lower latency, the global nature of business has further driven a need for fault tolerance to increase availability and reliability of electronic trading systems. Scheduled outages must be minimized and unscheduled outages must be eliminated.

Furthermore, to implement the Exchange's clearing function, which mitigates the concerns of market participants relating to performance by counter parties, protects the interests of the Exchange and otherwise adequately manages/mitigates risk, risk management systems having corresponding operational efficiency and performance are needed so as to protect the Exchange from loss while minimizing impediments to market operations or distractions to market participants with ancillary and unnecessary tasks. In addition, increased transaction volume may further translate into greater exposure for market participants requiring greater amounts of capital to be posted to cover losses. Accordingly, more accurate and/or tailored risk assessment may be required to ensure that only the necessary minimum amount of capital is required to be allocated by the market participants to cover potential losses and avoid undue encumbrances on/impediments to the ability of those market participants to conduct their business.

Improved speed and efficiency also increases the speed at which problems may occur and propagate, or otherwise be exploited, such as where the market ceases to operate as intended, i.e. the market no longer reflects a true consensus of the value of traded products among the market participants. Such problems are typically, but not always, evidenced by extreme market activity such as large changes in price, whether up or down, over a short period of time or an extreme volume of trades taking place. In particular, market participants, whether human or electronic, may not always react in a rational manner, such as when presented with imperfect information, when acting in fraudulent or otherwise unethical manner, and/or due to faulty training or design. For example, while communications technologies may have improved, inequities still exist in both access to information and access to opportunities to participate, which may not be due to any violations of legislative, regulatory and/or ethical rules, e.g. some traders receive information before other traders because they can afford faster communications channels, some traders may be able to place trade orders more quickly than others because they have faster computers. In many cases, irrational and/or exploitive trader behavior may be triggered by a market event, such as a change in price, creating a feedback loop where the initial irrational reaction may then cause further market events, such as continued price drops, triggering further responses and resulting in an extreme change in the price of the traded product in a short period of time. High speed trading exacerbates the problem as there may be little time for traders/algorithmic trading systems, or those overseeing them, to contemplate and temper their reactions before significant losses may be incurred. Furthermore, improved communications among traders facilitates exploitation of information inequities and propagation of irrational behavior in one market to other markets as traders in those other markets react to the results of the irrational behavior. Market protection systems may therefore be needed to monitor and evaluate trading activity, detect illegitimate/exploitive activity and appropriately react more quickly to mitigate the spread of problems, again without impeding legitimate market operation.

IV. Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

As may be perceived/experienced by the market participants from outside the Exchange or electronic trading system operated thereby, the following sequence describes how, at least in part, information may be propagated in such a system and how orders may be processed:

(1) An opportunity is created at a matching engine of the Exchange, such as by placing a recently received but unmatched order on the order book to rest;

(2) The matching engine creates an update reflecting the opportunity and sends it to a feed engine;

(3) The feed engine multicasts it to all of the market participants to advertise the opportunity to trade;

(4) The market participants evaluate the opportunity and each, upon completion of their evaluation, may or may not choose to respond with an order responsive to the resting order, i.e. counter to the resting order;

(5) The Exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

V. Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

VI. Example Users

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

VII. Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for sell (or relinquish) transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

VIII. Spread Instruments

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \qquad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

IX. Implication

Thus an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order to create matches therein, are referred to as "implied" orders.

Upon receipt of an incoming order, the identification or derivation of suitable implied orders which would allow at least a partial trade of the incoming outright order to be executed is referred to as "implication" or "implied matching", the identified orders being referred to as an "implied match." Depending on the number of component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed, electronically communicated to the market participants, to appear available to trade in order to solicit the desired orders from the market participants. Depending on the number of component financial instruments involved, and whether those component financial instruments further comprise component financial instruments of their own, there may be numerous implied opportunities, the submission of a counter order in response thereto, that would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the exchange will benefit from increased transaction volume. However, identifying implied opportunities may be computationally intensive. One response message may trigger the calculations of hundreds or thousands of calculations to determine implied opportunities, which are then published, e.g., as implied messages, via market data feeds. In a high performance trading system where low transaction latency is important, it may be important to identify and advertise implied opportunities quickly so as to improve or maintain market participant interest and/or market liquidity.

For example, two different outright orders may be resting on the books, or be available to trade or match. The orders may be resting because there are no outright orders that match the resting orders. Thus, each of the orders may wait or rest on the books until an appropriate outright counter-offer comes into the exchange, or is placed by a user of the exchange. The orders may be for two different contracts that only differ in delivery dates. It should be appreciated that such orders could be represented as a calendar spread order. Instead of waiting for two appropriate outright orders to be received that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the exchange computing system may be configured to detect that the two resting orders may be combined into an order in the spread instrument and accordingly creates an implied order.

In other words, the exchange may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic matching system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some exchanges attempt to match orders for spread products with multiple orders for legs of the spread products. With such systems, every spread product contract is broken down into a collection of legs and an attempt is made to match orders for the legs.

Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradable items, which has the potential of attracting additional traders. Exchanges benefit from increased transaction volume. Transaction volume may also increase as the number of matched trade items increases.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets", the entire disclosure of which is incorporated by reference herein and relied upon. Settlement price determination techniques may be implemented to cover calendar month spread instruments having different deferred month contracts.

Referring again to data transaction processing systems, a system may depend on certain rules, logic, and inter-related objects and data. In technical and computing environments, a system may calculate values for multiple objects subject to rules, e.g., business or environment logic, associated with the objects. Certain object types may also depend on other object types. For example, a computing environment may include multiple objects of different types, e.g., base objects and composite objects. A composite object as used herein is an object whose value depends on, is related to, or is influenced by, the values of other objects, such as base objects or other composite objects. For example, a composite object may involve transactions between multiple, e.g., two, base objects. Or, a composite object may define a relationship between other objects. Thus, composite objects depend on the values of other system objects. In one embodiment, a composite object involves or defines a transaction or relationship between at least two other objects. For example, a composite object involves or defines a transaction or relationship between two base objects. A base object may represent an outright order associated with a financial instrument, and a composite object may represent a spread order associated with a financial instrument.

X. Computing Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
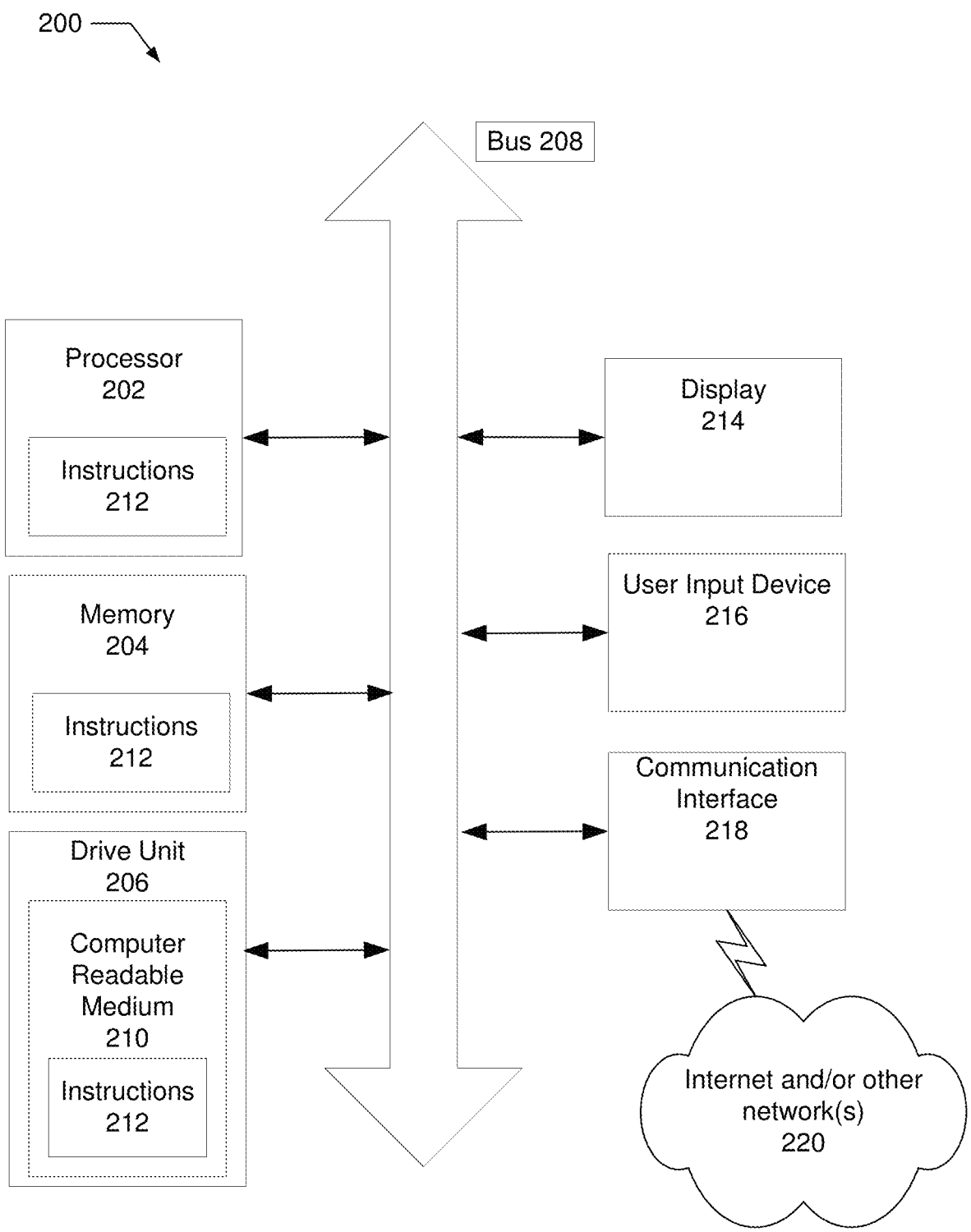
FIG. 2 depicts a general computer system, according to some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120, or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein may utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118, and used for determining MQI scores of market participants.

XI. Order Book Object Data Structures

Figure 3A:
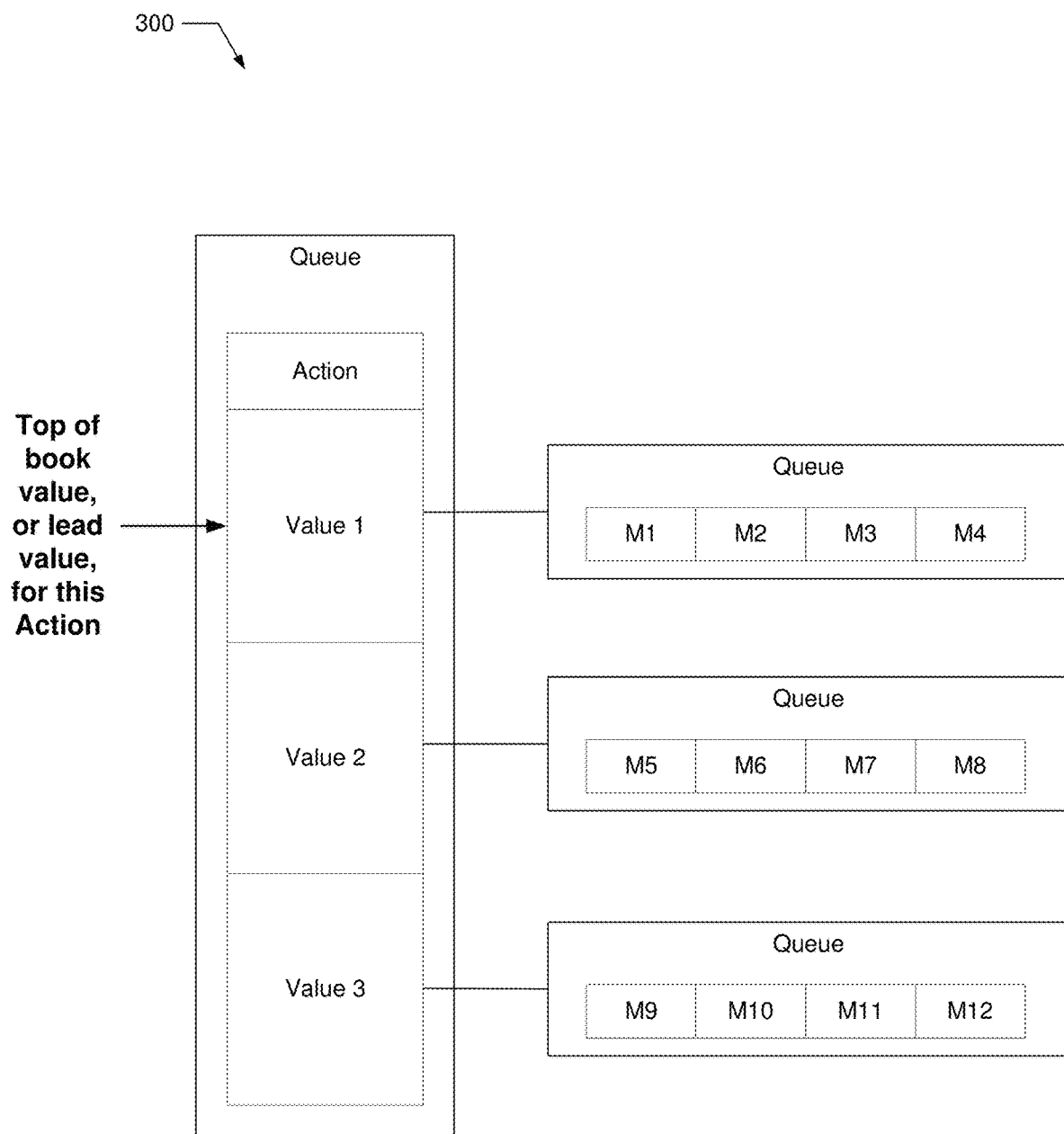
FIG. 3A depicts a storage data structure, according to some embodiments.

In one embodiment, the messages and/or values received for each object may be stored in queues according to value and/or priority techniques implemented by an exchange computing system 100. FIG. 3A illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system may keep track of different orders or messages for buying or selling quantities of objects at specified values.

Although the present application contemplates using queue data structures for storing messages in a memory, the implementation may involve additional pointers, i.e., memory address pointers, or linking to other data structures. Incoming messages may be stored at an identifiable memory address. The transaction processor can traverse messages in order by pointing to and retrieving different messages from the different memories. Thus, messages that may be depicted sequentially, e.g., in FIG. 3B below, may actually be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to the disclosed system. Thus, in one embodiment, the value having the best priority may be illustrated as being in the topmost position in a queue, although the system may be configured to place the best priority message in some other predetermined position. In the example of FIG. 3A, Value 1 is shown as being the best value or lead value, or the top of the book value, for an example Action.

A lead acquisition value may be the best or lead value in an acquisition queue of an order book object, and a lead relinquish value may be the best or lead value in a relinquish queue of the order book object.

Figure 3B:
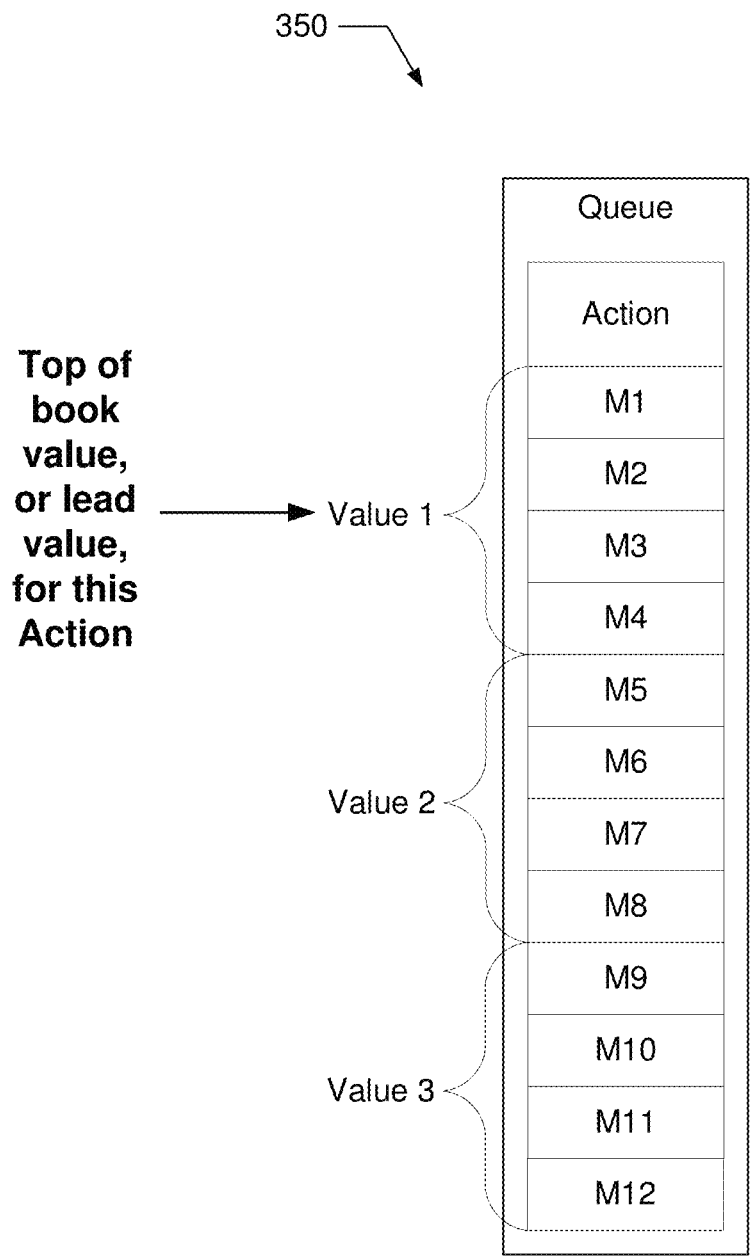
FIG. 3B depicts another storage data structure, according to some embodiments.

FIG. 3B illustrates an example alternative data structure 350 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 3B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In one embodiment, the system may traverse through a number of different values and associated messages when processing an incoming message. Traversing values may involve the processor loading each value, checking that value and deciding whether to load another value, i.e., by accessing the address pointed at by the address pointer value. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Figure 3C:
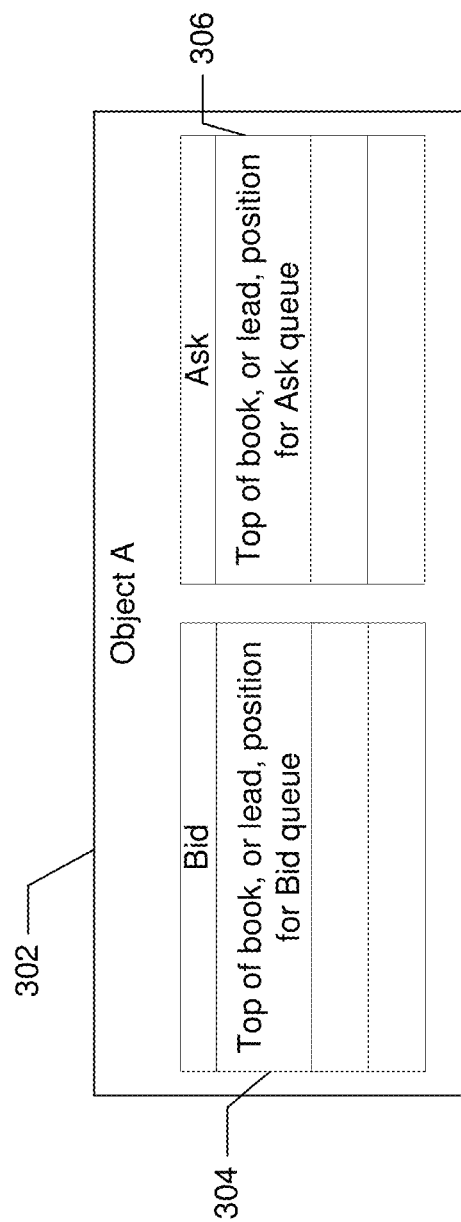
FIG. 3C depicts yet another data structure, according to some embodiments.

For example, as shown in FIG. 3C, the order book module of a computing system may include several paired queues, such as queues Bid and Ask for an object 302 (e.g., Object A). The system may include two queues, or one pair of queues, for each object that is matched or processed by the system. In one embodiment, the system stores messages in the queues that have not yet been matched or processed. FIG. 3C may be an implementation of the data structures disclosed in FIGS. 3A and/or 3B. Each queue may have a top of book, or lead, position, such as positions 304 and 306, which stores data that is retrievable.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be for example implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object. The messages may be received from the same or different users or traders.

The queues illustrated in FIG. 3C hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

When the data transaction processing system is implemented as an exchange computing system, as discussed above, different client computers submit electronic data transaction request messages to the exchange computing system. Electronic data transaction request messages include requests to perform a transaction on a data object, e.g., at a value for a quantity. The exchange computing system includes a transaction processor, e.g., a hardware matching processor or match engine, that matches, or attempts to match, pairs of messages with each other. For example, messages may match if they contain counter instructions (e.g., one message includes instructions to buy, the other message includes instructions to sell) for the same product at the same value. In some cases, depending on the nature of the message, the value at which a match occurs may be the submitted value or a better value. A better value may mean higher or lower value depending on the specific transaction requested. For example, a buy order may match at the submitted buy value or a lower (e.g., better) value. A sell order may match at the submitted sell value or a higher (e.g., better) value.

XII. Transaction Processor Data Structures

Figure 4A:
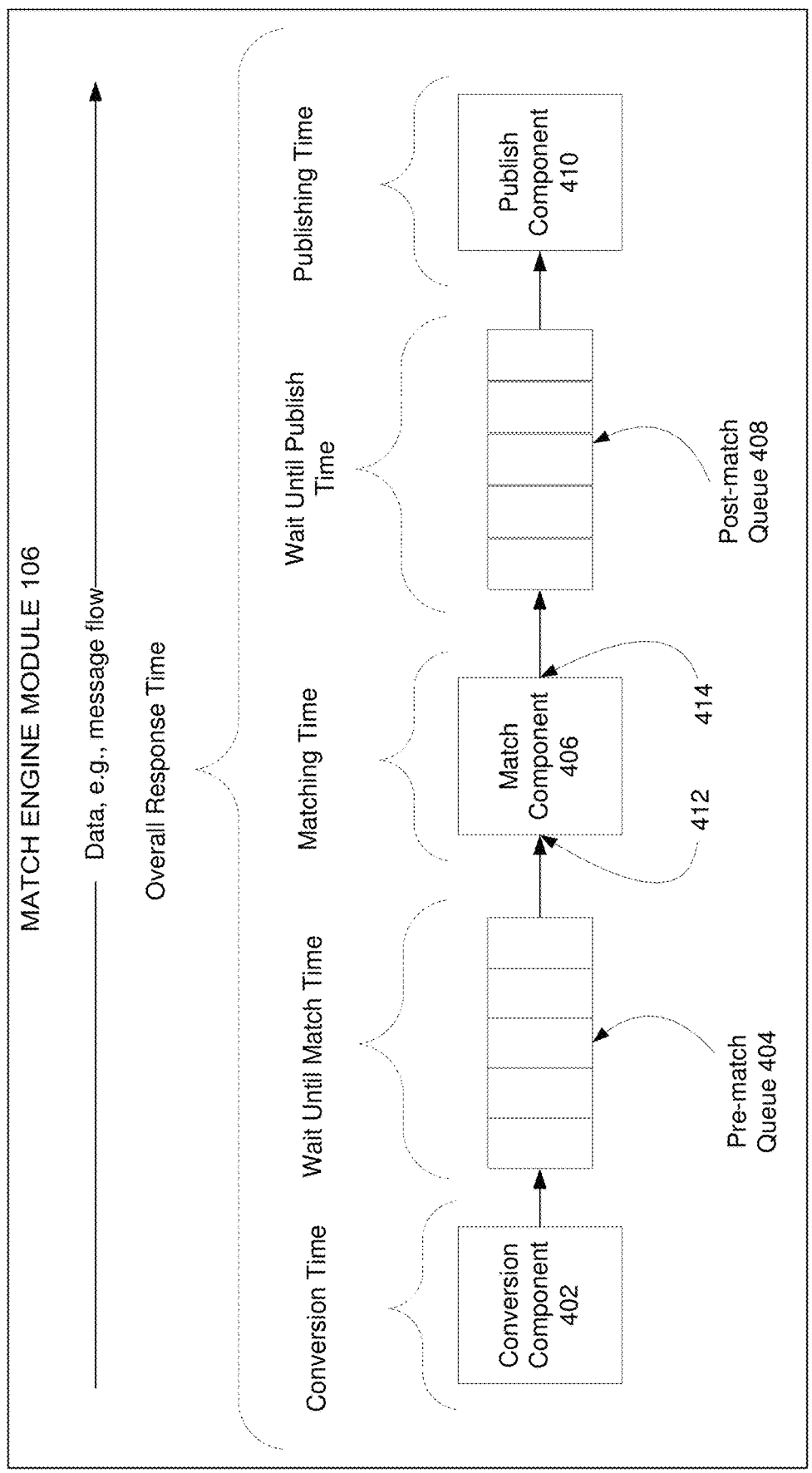
FIG. 4A depicts a match engine module, according to some embodiments.

FIG. 4A illustrates an example embodiment of a data structure used to implement match engine module 106. Match engine module 106 may include a conversion component 402, pre-match queue 404, match component 406, post-match queue 408 and publish component 410.

Although the embodiments are disclosed as being implemented in queues, it should be understood that different data structures, such as for example linked lists or trees, may also be used. Although the application contemplates using queue data structures for storing messages in a memory, the implementation may involve additional pointers, i.e., memory address pointers, or linking to other data structures. Thus, in one embodiment, each incoming message may be stored at an identifiable memory address. The transaction processing components can traverse messages in order by pointing to and retrieving different messages from the different memories. Thus, messages that may be processed sequentially in queues may actually be stored in memory in disparate locations. The software programs implementing the transaction processing may retrieve and process messages in sequence from the various disparate (e.g., random) locations.

The queues described herein may, in one embodiment, be structured so that the messages are stored in sequence according to time of receipt, e.g., they may be first in first out (FIFO) queues.

The match engine module 106 may be an example of a transaction processing system. The pre-match queue 404 may be an example of a pre-transaction queue. The match component 406 may be an example of a transaction component. The post-match queue 408 may be an example of a post-transaction queue. The publish component 410 may be an example of a distribution component. The transaction component may process messages and generate transaction component results.

Figure 4B:
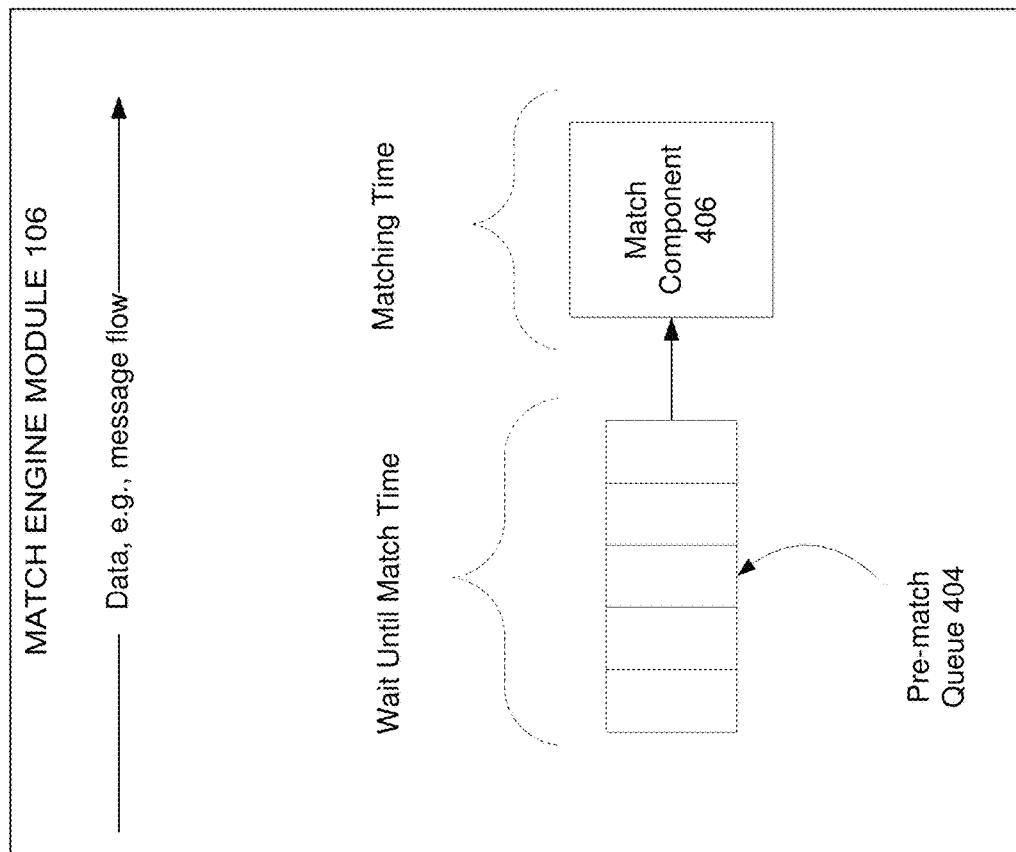
FIG. 4B depicts another match engine module, according to some embodiments.

It should be appreciated that match engine module 106 may not include all of the components described herein. For example, match engine module 106 may only include pre-match queue 404 and match component 406, as shown in FIG. 4B. In one embodiment, the latency detection system may detect how long a message waits in a pre-match queue 404 (e.g., latency), and compares the latency to the maximum allowable latency associated with the message.

In one embodiment, the publish component may be a distribution component that can distribute data to one or more market participant computers. In one embodiment, match engine module 106 operates according to a first in, first out (FIFO) ordering. The conversion component 402 converts or extracts a message received from a trader via the Market Segment Gateway or MSG into a message format that can be input into the pre-match queue 404.

Messages from the pre-match queue may enter the match component 406 sequentially and may be processed sequentially. In one regard, the pre-transaction queue, e.g., the pre-match queue, may be considered to be a buffer or waiting spot for messages before they can enter and be processed by the transaction component, e.g., the match component. The match component matches orders, and the time a messages spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out (FIFO) methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component 406 processes an order or message, at which point the transaction processing system may consider the order or message as having been processed. The match component 406 may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generate an acknowledgement message. Thus, the match component 406 in one embodiment will generate at least one message, but may generate more messages, depending upon the activities occurring in the match component. For example, the more orders that are matched due to a given message being processed by the match component, the more time may be needed to process that message. Other messages behind that given message will have to wait in the pre-match queue.

Messages resulting from matches in the match component 406 enter the post-match queue 408. The post-match queue may be similar in functionality and structure to the pre-match queue discussed above, e.g., the post-match queue is a FIFO queue of fixed size. As illustrated in FIG. 4A, a difference between the pre- and post-match queues may be the location and contents of the structures, namely, the pre-match queue stores messages that are waiting to be processed, whereas the post-match queue stores match component results due to matching by the match component. The match component receives messages from the pre-match queue, and sends match component results to the post-match queue. In one embodiment, the time that results messages, generated due to the transaction processing of a given message, spend in the post-match queue is not included in the latency calculation for the given message.

Messages from the post-match queue 408 enter the publish component 410 sequentially and are published via the MSG sequentially. Thus, the messages in the post-match queue 408 are an effect or result of the messages that were previously in the pre-match queue 404. In other words, messages that are in the pre-match queue 404 at any given time will have an impact on or affect the contents of the post-match queue 408, depending on the events that occur in the match component 406 once the messages in the pre-match queue 404 enter the match component 406.

As noted above, the match engine module 106 in one embodiment operates in a first in first out (FIFO) scheme. In other words, the first message that enters the match engine module 106 is the first message that is processed by the match engine module 106. Thus, the match engine module 106 in one embodiment processes messages in the order the messages are received. In FIG. 4A, as shown by the data flow arrow, data is processed sequentially by the illustrated structures from left to right, beginning at the conversion component 402, to the pre-match queue, to the match component 406, to the post-match queue 408, and to the publish component 410. The overall transaction processing system operates in a FIFO scheme such that data flows from element 402 to 404 to 406 to 408 to 410, in that order. If any one of the queues or components of the transaction processing system experiences a delay, that creates a backlog for the structures preceding the delayed structure. For example, if the match or transaction component is undergoing a high processing volume, and if the pre-match or pre-transaction queue is full of messages waiting to enter the match or transaction component, the conversion component may not be able to add any more messages to the pre-match or pre-transaction queue.

Messages wait in the pre-match queue. The time a message waits in the pre-match queue depends upon how many messages are ahead of that message (i.e., earlier messages), and how much time each of the earlier messages spends being serviced or processed by the match component. Messages also wait in the post-match queue. The time a message waits in the post-match queue depends upon how many messages are ahead of that message (i.e., earlier messages), and how much time each of the earlier messages spends being serviced or processed by the publish component. These wait times may be viewed as a latency that can affect a market participant's trading strategy.

After a message is published (after being processed by the components and/or queues of the match engine module), e.g., via a market data feed, the message becomes public information and is publicly viewable and accessible. Traders consuming such published messages may act upon those message, e.g., submit additional new input messages to the exchange computing system responsive to the published messages.

The match component attempts to match aggressing or incoming orders against resting orders. If an aggressing order does not match any resting orders, then the aggressing order may become a resting order, or an order resting on the books. For example, if a message includes a new order that is specified to have a one-year time in force, and the new order does not match any existing resting order, the new order will essentially become a resting order to be matched (or attempted to be matched) with some future aggressing order. The new order will then remain on the books for one year. On the other hand, an order specified as a fill or kill (e.g., if the order cannot be filled or matched with an order currently resting on the books, the order should be canceled) will never become a resting order, because it will either be filled or matched with a currently resting order, or it will be canceled. The amount of time needed to process or service a message once that message has entered the match component may be referred to as a service time. The service time for a message may depend on the state of the order books when the message enters the match component, as well as the contents, e.g., orders, that are in the message.

In one embodiment, orders in a message are considered to be "locked in", or processed, or committed, upon reaching and entering the match component. If the terms of the aggressing order match a resting order when the aggressing order enters the match component, then the aggressing order will be in one embodiment guaranteed to match.

As noted above, the latency experienced by a message, or the amount of time a message spends waiting to enter the match component, depends upon how many messages are ahead of that message (i.e., earlier messages), and how much time each of the earlier messages spends being serviced or processed by the match component. The amount of time a match component spends processing, matching or attempting to match a message depends upon the type of message, or the characteristics of the message. The time spent inside the processor may be considered to be a service time, e.g., the amount of time a message spends being processed or serviced by the processor.

The number of matches or fills that may be generated in response to a new order message for a financial instrument will depend on the state of the data object representing the electronic marketplace for the financial instrument. The state of the match engine can change based on the contents of incoming messages.

It should be appreciated that the match engine's overall latency is in part a result of the match engine processing the messages it receives. The match component's service time may be a function of the message type (e.g., new, modify, cancel), message arrival rate (e.g., how many orders or messages is the match engine module receiving, e.g., messages per second), message arrival time (e.g., the time a message hits the inbound MSG or market segment gateway), number of fills generated (e.g., how many fills were generated due to a given message, or how many orders matched due to an aggressing or received order), or number of Mass Quote entries (e.g., how many of the entries request a mass quote).

In one embodiment, the time a message spends:

Being converted in the conversion component 402 may be referred to as a conversion time;

Waiting in the pre-match queue 404 may be referred to as a wait until match time;

Being processed or serviced in the match component 406 may be referred to as a matching time;

Waiting in the post-match queue 408 may be referred to as a wait until publish time; and Being processed or published via the publish component 410 may be referred to as a publishing time.

It should be appreciated that the latency may be calculated, in one embodiment, as the sum of the conversion time and wait until match time. Or, the system may calculate latency as the sum of the conversion time, wait until match time, matching time, wait until publish time, and publishing time. In systems where some or all of those times are negligible, or consistent, a measured latency may only include the sum of some of those times. Or, a system may be designed to only calculate one of the times that is the most variable, or that dominates (e.g., percentage wise) the overall latency. For example, some market participants may only care about how long a newly sent message that is added to the end of the pre-match queue will spend waiting in the pre-match queue. Other market participants may care about how long that market participant will have to wait to receive an acknowledgement from the match engine that a message has entered the match component. Yet other market participants may care about how much time will pass from when a message is sent to the match engine's conversion component to when match component results exit or egress from the publish component.

XIII Optimized Data Structure

Figure 5:
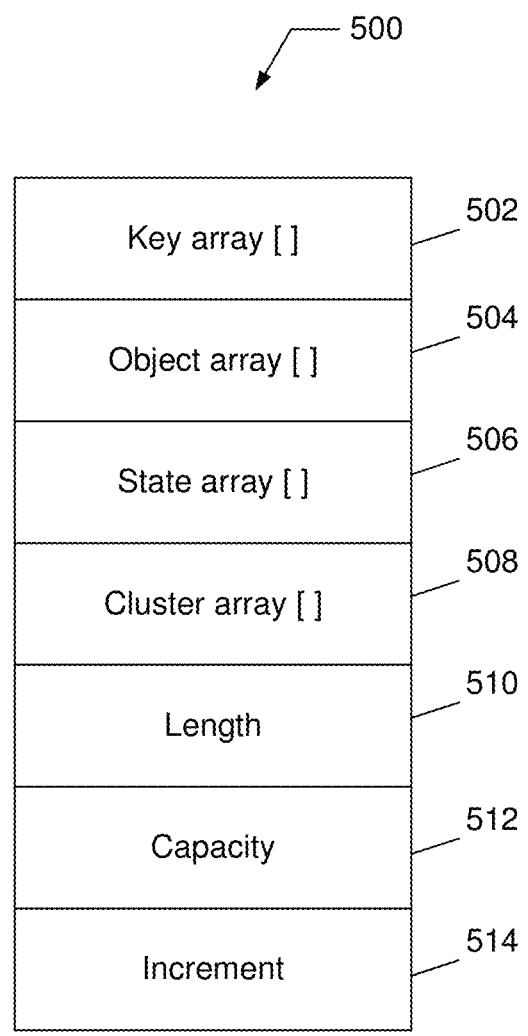
FIG. 5 illustrates an example block diagram of an example data structure, according to some embodiments.

FIG. 5 illustrates an example block diagram of an example data structure 500 used in implementing the disclosed embodiments. Data structure 500 includes a plurality of fields for the storage of data/information. A field can include an element of a data structure in which one or more items of data are stored. A field of a data structure can be populated with a value, for example, when data is stored in the field. The data structure may be associated with a definition, which can include information describing qualities of the data structure, such as, for example, a name of the data structure, names of the fields for storage of data within the data structure, and properties of the fields for storage of data, including, e.g., a type of data that can be stored in a field, a size constraint for the type of data that can be stored in the field, information specifying whether the field is an optional field (e.g., a field that can be populated with data), information specifying whether the field is a mandatory field (e.g., a field that is required to be populated with data), etc. In one embodiment, a data structure definition for a field may define that the field can store another data structure or object.

Data structure 500 includes a key array field 502, object array field 504, a state array field 506, a cluster array field 508, a length field 510, a capacity field 512, and an increment field 514. All of the elements in an array are typically of the same data type. The arrays may include a plurality of fields or locations in which data elements may be stored. Each location within the array may be associated with/identifiable by an index. A data element is stored at a location specified by an index in the array.

The key array field 502 may contain an array that stores different keys. In other words, the data elements stored in the key array may be keys, e.g., keys for records/objects stored in the object array field 504 discussed below. For example, the key array may store different order IDs generated by a match engine of an exchange computing system.

The object array field 504 may contain an array that stores different data objects, e.g., information about orders corresponding to order IDs (which again may be stored in the key array 502). The key array and the object array may function as a key-value map, where the key is used to look up a value/object stored in the data structure 500. In other words, a key stored at index 5 in the key array is associated with the value (e.g., data object) stored at index 5 in the object array. To look up a particular order, the key for that order is required, so that the order can be retrieved.

The state array field 506 may contain an array (a state array) that specifies whether a position in the corresponding key array (stored in field 502) is empty/void, or whether the position in the key array stores data elements/information. For example, the state array may include either a "1" in a position to indicate that the corresponding position in the key array contains a data element (e.g., an order ID), or may include a "0" to indicate that the corresponding position in the key array contains old/stale data, or garbage. In other words, the value stored at an index in the state array indicates whether the data element in the key array or object array is valid, active data or old, garbage data that was requested to be deleted. In computer science, garbage includes objects, data, or other regions of the memory of a computer system (or other system resources, such as a data array), which will not be used in any future computation by the system, or by a program running on it. It is frequently necessary to deallocate garbage and return it to the heap, or memory pool, so the associated memory can be reused. In the present application, an array index that contains garbage data may be said to be void, because the index contains useless data. It should be appreciated that even though the present application may refer to a data element as having been deleted, the data element may still exist in the system, but with the understanding that the data element will not be used by the system.

The indices in the various arrays may correspond to each other, so that it may be understood that the same index across different arrays (key array, object array, state array) relate to each other, or may correspond to each other.

In one embodiment, the system may not need to set the value of a position/bucket in state array 506 as 1 when data (e.g., a key) is added to the key array, and may instead be configured to only set the value of a position/bucket in state array 506 to 0 upon deleting data from the key array.

The cluster array field 508 may contain an array that specifies the different clusters of keys that exist in the corresponding key array (stored in field 502). A cluster is a set of keys that are continuous, based on the increment (discussed below) for the keys being stored in the key array. For example, elements/keys 8, 9 and 10 with an increment of one are a cluster. Elements 8, 9, 10, 15, 18, 19, 20, 43, with an increment of one, would be stored in the disclosed data structure as four clusters, specifically, cluster 1: 8, 9, 10; cluster 2: 15; cluster 3: 18, 19, 20; and cluster 4: 43. For each data element cluster (also referred to as a key cluster, or as an order ID cluster when the keys are order IDs), the cluster array field 508 contains a cluster code, a start index, and an end index. The disclosed cluster code and indices are utilized to quickly and efficiently lookup data elements stored in a cluster, as discussed herein.

The length field 510 specifies how many data elements are currently being used by the corresponding key array (stored in field 502). The capacity field 512 specifies the maximum number of data elements (e.g., keys) that can be stored in the corresponding key array (stored in field 502). The capacity field 512 may be based on the amount of memory/resources allocated to the data structure.

The increment field 514 specifies the increment by which values stored in the key array, if increased by the specified increment, would be considered to be "continuous". For example, a set of keys stored in the key array may include continuous keys that increase or decrease by the same amount. That same data set may also include discontinuous data, i.e., a data set where the elements do not increase by the same amount. Accordingly, the increment field 514 stores the increment which is used to determine whether two or more data elements are continuous with each other, or are not continuous with each other. In one embodiment, the disclosed data structure may determine the actual increment between two data elements by calculating the difference between the two data elements, e.g., subtracting the previous data element from a currently received data element. For example, if the system stores data element 947, and then stores data element 1,015 in the next available position, the actual increment between 1,015 and 947 is calculated as 1,015−947=68. If that data structure specifies an increment of 1, the data structure stores the two data elements 947 and 1,015 in two different clusters. More specifically, the data structure defines two different data clusters, where one of the data clusters includes 947, and the other data cluster includes 1,105.

Figure 6:
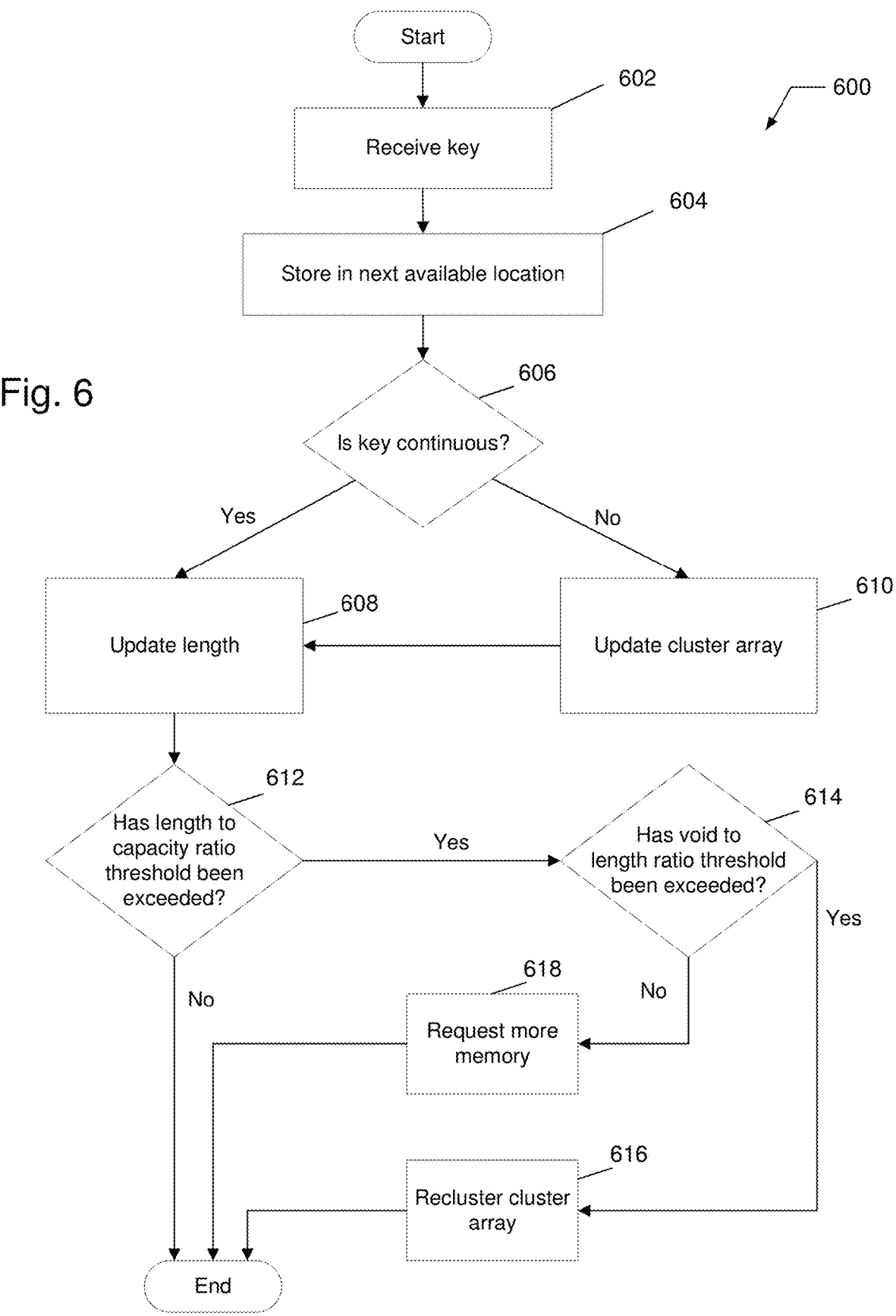
FIG. 6 illustrates an example flowchart for storing data in an example data structure, according to some embodiments.

FIG. 6 illustrates an example flowchart 600 for storing data in a data structure according to an embodiment of the present disclosure. At step 602, a key which is to be stored in the data structure is received. At step 604, the key is stored in the next available location in the key array. The next available location of a key array may be indicated by a pointer that points to the next available position, identifiable by an index, in the array. If there is a data object associated with the key, then the object is stored in the object array at an index corresponding to the index where the key is stored in the key array.

At step 606, it is determined whether the key is continuous with keys already stored in the data structure. As described above, the data structure is optimized to store continuous data, which may be defined as data that continuously changes (e.g., increases) per an increment size. For example, for a data set having an increment of 1, the values 3, 4 and 5 are considered continuous. However, for a data set having an increment of 0.5, the values 3, 4 and 5 are not considered continuous. Instead, for a data set having an increment of 0.5, the values 3, 3.5, 4, 4.5, and 5 are considered continuous. Accordingly, at step 606, the method 600 includes determining whether the key is continuous with previously received data based on the increment specified for the data type being stored in the data structure. If the received key is the first key being stored in the key array, it is added to the first cluster which may be created when the data structure is initialized. If it is determined, at step 606, that the data element/key is continuous with previously received data, at step 608, the length 510 for the key array, stored in the data structure, is updated. In particular, the length is incremented by one, to reflect the addition of the received key to the key array.

But, if it is determined, at step 606, that the key is not continuous with previously received data, at step 610, the cluster array is updated to specify a new cluster. Because each cluster contains continuous (as defined by the increment) data, if the key being added to the key array is discontinuous, the key is associated with a new cluster. As described above, each cluster may be associated with a cluster code. The cluster code may be defined as a difference between the key and the index of the key. Specifically, the cluster code may be calculated as:

$$\text{Cluster code} = \text{key minus key index} \quad \text{(equation 2)}$$

As will be described in further detail below, the special cluster code provides a value that when subtracted from a lookup key, results in the exact index/location of the lookup key. A lookup key can accordingly be retrieved in exactly one calculation, making the lookup both rapid and predictable. The cluster code is different for each cluster in the cluster array, and enables rapid access to data elements stored in the data array. Referring back to step 610, when a new cluster is added to the cluster array, the cluster code of the new cluster is determined based on the key being added and the key index where the key is stored in the key array. The index of the key being added (which is the first key in the newly created cluster) is stored as the start index of the new cluster. In one embodiment, the same index may be specified as the end index of the new cluster. Alternatively, a cluster's end index may not be specified, and may instead be determined based on the next cluster's start index, because the end index of a cluster is one position less (index minus one) of the start index of the next cluster.

In one embodiment, the position immediately prior to where the new key is stored is specified as the end index for the cluster that was previously the last cluster in the cluster array. Alternatively, that cluster's end index may not be specified, and may instead be determined based on the newly added cluster's start index.

After the cluster array is updated at step 610, the length 510 is updated at step 608, as described above. At step 612, it is determined whether the length to capacity ratio exceeds a predetermined threshold. For example, an application may be allocated a certain amount of memory in which to store data, which is the data storage capacity of the application. The length of the key array is based on the position of the pointer, e.g., the furthest index that has been used to store active (not garbage) data (e.g., keys).

If the length to capacity ratio exceeds a predetermined threshold, at step 614, it is determined whether the void spaces (which may either by empty, or contain useless data) to length ratio exceeds a predetermined threshold. As described below, whenever data elements are to be deleted from the key array, the state array is updated to reflect that the index of the position from where the deleted data was stored is now void, or contains garbage.

If the number of void spaces compared to the length (space) of memory being used by the key array exceeds the predetermined threshold, the method includes reclustering the key array, at step 616.

If the void spaces to length ratio does not exceed a predetermined threshold, then at step 618, the application requests more memory. For example, the application may attempt to grow the array by copying the array into a larger array, i.e., by increasing the capacity allocated to the data structure.

In one embodiment, method 600 may only attempt to recluster the cluster array (step 616) if the application implementing the disclosed data structure cannot be allocated more memory (i.e., as a result of the request of step 618).

Figure 7:
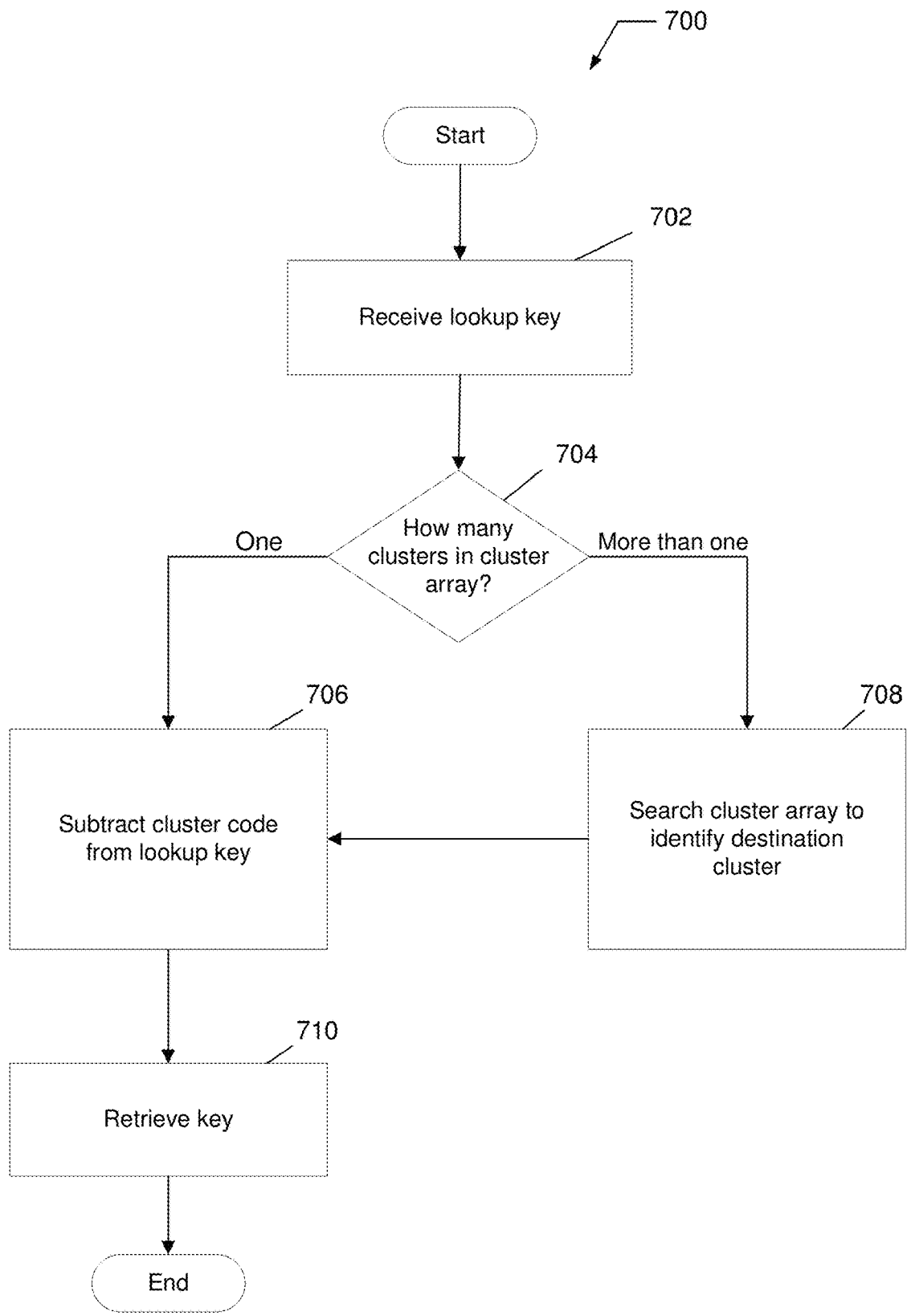
FIG. 7 illustrates an example flowchart for looking up data from a data structure, according to some embodiments.

FIG. 7 illustrates an example flowchart 700 for looking up a key from a data structure according to an embodiment of the present disclosure. For example, an application may request retrieval of a data object, such as a record, associated with a key. At step 702, a key to look up, i.e., a lookup key, is received. At step 704, the number of clusters in the cluster array associated with the data structure is determined. The cluster array may be stored as a binary tree. If there is only one cluster, i.e., the stored data elements have all been grouped into a single cluster, then the cluster code of the cluster is subtracted from the lookup key to rapidly identify the index of the lookup key (step 706). The result is the specific location (index) of the lookup key, at which point the correct key can be retrieved (710) from the key array. If the application requests the object (e.g., order information) associated with the key (order ID), the object can also be retrieved based on the location of the lookup key.

If there are multiple clusters in the cluster array, method 700 at step 708 includes performing a binary search of the cluster array, e.g., on a binary tree storing the contents of the cluster array. For example, the cluster array may be sorted, i.e., each cluster is sorted in order based on the keys stored therein. For example, the clusters may be sorted by cluster codes, which follow the ordering of the keys stored therein. The contents of the sorted cluster array may be stored in a binary tree, where the cluster code of each cluster is represented by a node in the binary tree. Alternatively, each cluster may be represented by a node whose contents are equal to the cluster code plus the start index of the cluster. In other words, each cluster may be represented by the first key stored by that cluster. To identify the cluster where a lookup key is stored, the system performs a binary sort where the lookup key is compared to the cluster nodes, which may be sorted, i.e., ordered numerically. For example, the system performs a binary search dividing the range of clusters into halves, and narrows down the field of search until the correct cluster from the sorted clusters is located.

Upon locating the correct cluster, the cluster code of the cluster is subtracted from the lookup key to rapidly identify the index of the lookup key (step 706). The result is the specific location (index) of the lookup key, at which point the correct key can be retrieved (710) from the key array. If the application requests the object (e.g., order information) associated with the key (order ID), the object can also be retrieved based on the location of the lookup key.

Figure 8:
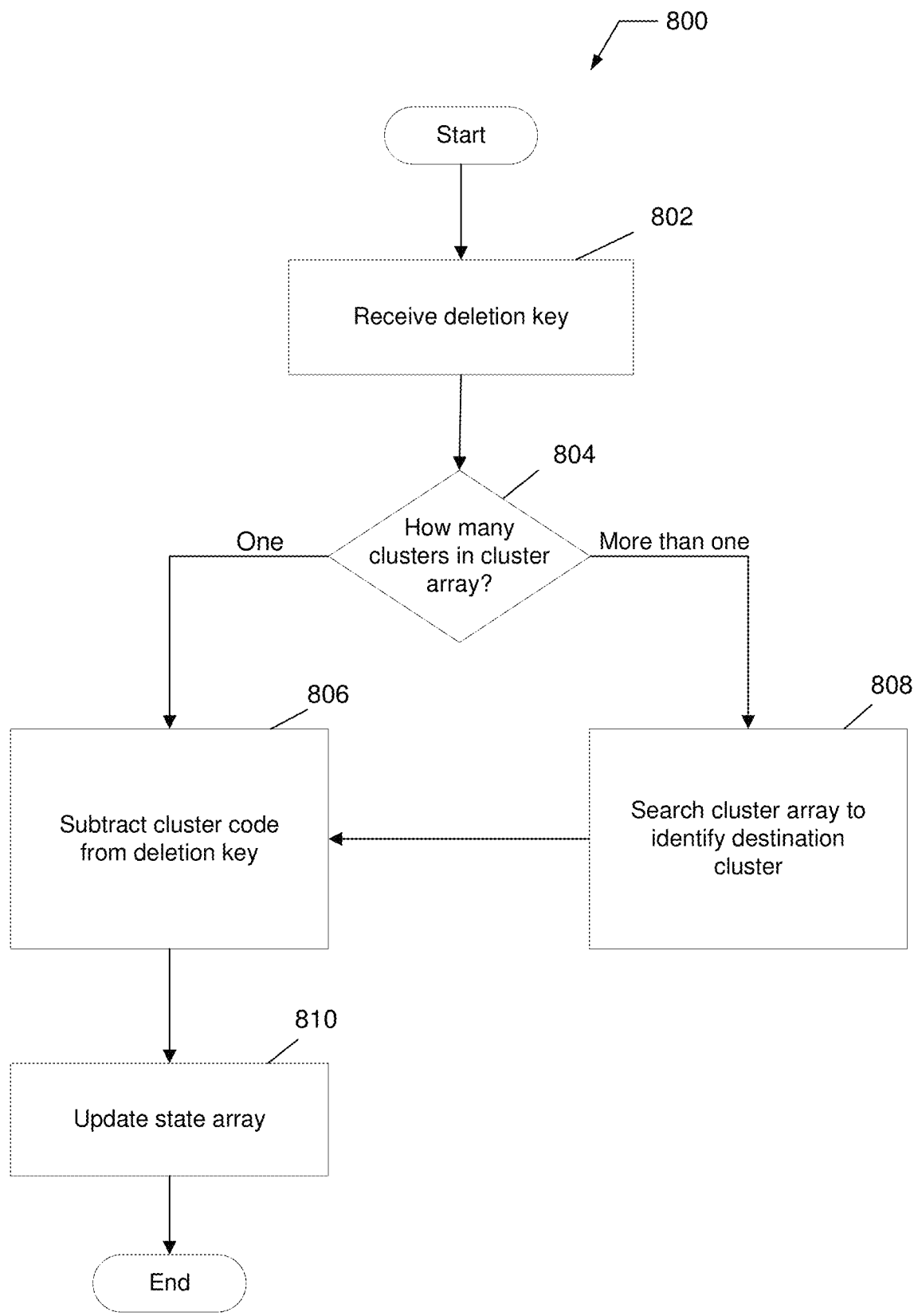
FIG. 8 illustrates an example flowchart for deleting data from a data structure, according to some embodiments.

FIG. 8 illustrates an example flowchart 800 for deleting data from a data structure according to an embodiment of the present disclosure. For example, an application may request deletion of a data object, such as a record, associated with a key. At step 802, a key to be deleted up, i.e., a deletion key, is received. At step 804, the number of clusters in the cluster array associated with the data structure is determined. The cluster array may be stored as a binary tree. If there is only one cluster, i.e., the stored data elements have all been grouped into a single cluster, then the cluster code of the cluster is subtracted from the deletion key to rapidly identify the index of the deletion key (step 806). The result is the specific location (index) of the deletion key, at which point the state array can be updated (step 810) to indicate that the determined location contains inactive data, i.e., garbage. For example, the corresponding index in the state array may be set to zero to indicate that the corresponding data element in the key array (and the object array) is garbage/to be deleted.

If there are multiple clusters in the cluster array, method 800 at step 808 includes performing a binary search of the cluster array, e.g., on a binary tree storing the contents of the cluster array. For example, the cluster array may be sorted, i.e., each cluster is sorted in order based on the keys stored therein. For example, the clusters may be sorted by cluster codes, which follow the ordering of the keys stored therein. The contents of the sorted cluster array may be stored in a binary tree, where the cluster code of each cluster is represented by a node in the binary tree. Alternatively, each cluster may be represented by a node whose contents are equal to the cluster code plus the start index of the cluster. In other words, each cluster may be represented by the first key stored by that cluster. To identify the cluster where a deletion key is stored, the system performs a binary sort where the deletion key is compared to the cluster nodes, which may be sorted, i.e., ordered numerically. For example, the system performs a binary search dividing the range of clusters into halves, and narrows down the field of search until the correct cluster from the sorted clusters is located.

Upon locating the correct cluster, the cluster code of the cluster is subtracted from the deletion key to rapidly identify the index of the deletion key (step 806). The result is the specific location (index) of the deletion key, at which point the state array can be updated (step 810) to indicate that the determined location contains inactive data, i.e., garbage. For example, the corresponding index in the state array may be set to zero to indicate that the corresponding data element in the key array (and the object array) is garbage/to be deleted.

Accordingly, in method 800, once the location (index) of the deletion key in the key array is identified, the corresponding index in the state array is updated/set to "0". Thus, it is may not be necessary to actually clear the location in the key array (or the object array). Instead, updating the state array signifies with a "0" indicates that any data in the key array or the object array at the index corresponding to the zeroed out index in the state array is old data/garbage/to be deleted at the next garbage collection. Alternatively, in one embodiment, the corresponding element in the key array (and the object array) may be actually deleted/cleared.

It should be appreciated that deleting information/setting an index in the state array to "0" does not trigger a reclustering of the clusters. A cluster may include a gap or a void in the data, e.g., when data is deleted from the key array. As will be described in further detail, data clusters generated according to the disclosed embodiments enable an increase in the speed and efficiency with which data (keys, and/or their associated objects/records) can be stored and/or accessed, especially if large key clusters (e.g., long continuous data sets) are generated. Notably, the length being "used" or reserved for the key array is not reduced or changed when a key is deleted, or marked as garbage/void/to be deleted. When data elements are eventually reclustered, the amount of space (the length) of the key array may be reduced, thereby allowing the data structure to reclaim memory that was empty, but still part of a cluster.

FIGS. 9A to 9F and 10B will now describe example implementations of the disclosed data structure and applications of the disclosed methods thereupon. An application such as a match engine of an exchange computing system may generate order IDs as new orders are received. These order IDs may be stored at an index of a key array, and a record of the information associated with the key (e.g., buy/sell or price information for an order) may be stored in an object array at an index corresponding to the index of the key array. The order IDs (and/or the corresponding data object) may thereafter be retrieved for lookups, or may be deleted (e.g., an order was canceled). Order IDs may be associated with a record for an order, and accordingly traders may wish to access/lookup information about orders associated with particular order IDs. In some of the examples, the order IDs may be the keys that are stored in the key array.

In one embodiment, the keys may have particular characteristics and attributes, which may be advantageously relied upon by the disclosed data structure to enable rapid key insertion and access. In an embodiment, the generator of the keys, e.g., a match engine, may follow a ruleset that results in the particular advantageous characteristics and attributes, for example, the generator may generate order IDs that are incremental and sequential, i.e., ever-increasing by the same amount. In one embodiment, the order IDs may be positive, unique integers, that are ever-increasing. In one embodiment, the keys may be based on timestamps, which may be generated by a clock in communication with the match engine. The disclosed data structure may be customized for the specific type of data being stored therein.

In one embodiment, the keys may be prices that are stored by the exchange computing system. Each price may be associated with additional information (a data record), but the records are looked up, stored and associated with a unique price. In that case, the key array stores prices which may increment by the same amount, such as prices $0.10, $0.20, $0.30, $0.40, $0.50, $0.60, $0.70, $0.80, $0.990, $1.00.

Figure 9A:
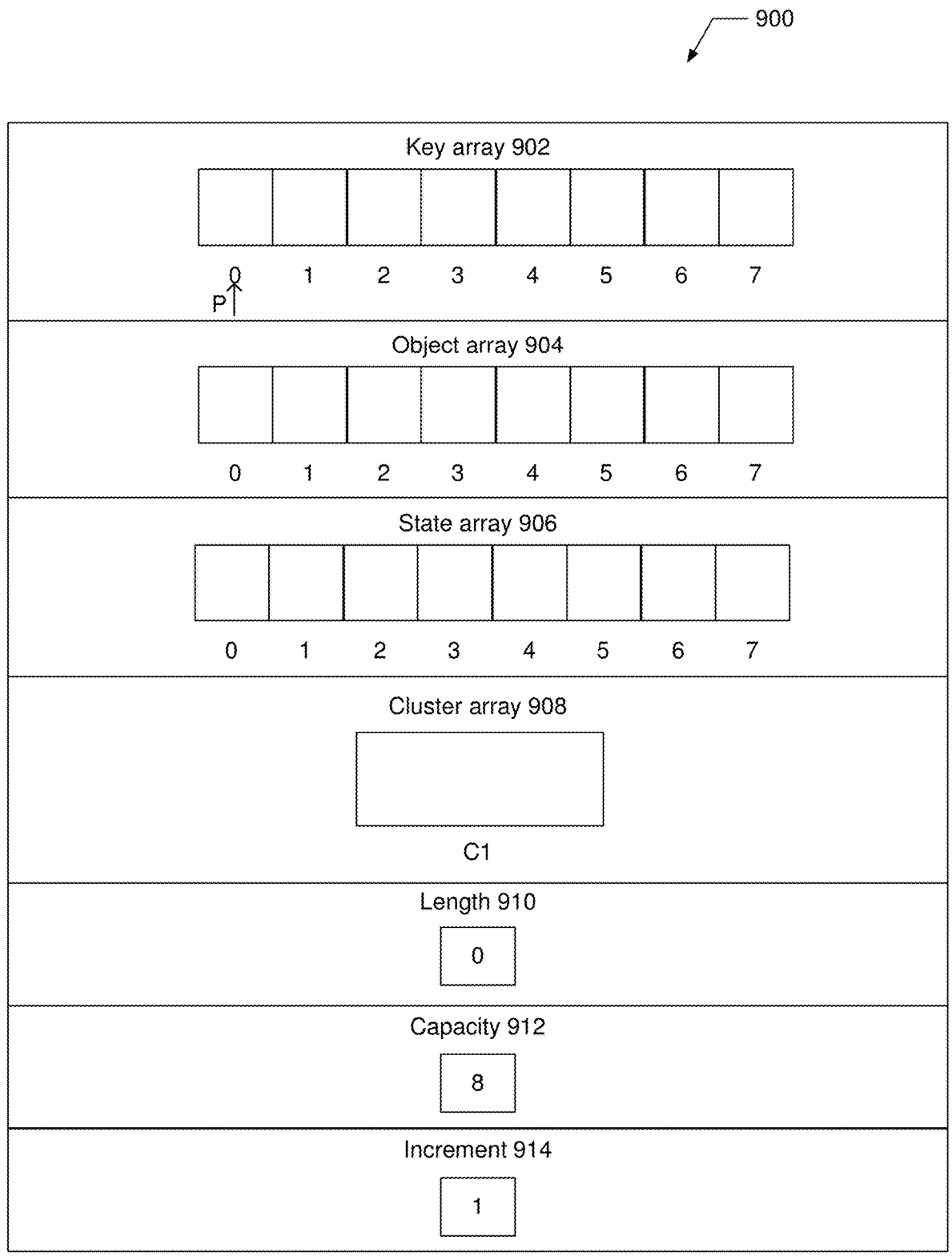
FIGS. 9A to 9F and 10B illustrate examples of data structures, according to some embodiments.

FIG. 9A illustrates an example data structure 900 before any keys and/or associated objects are stored in the data structure. Data structure 900 may be similar to/contain similar elements to data structure 500. Data structure 900 may be initialized by an application of a data transaction processing system that generates records and associated keys for temporary or permanent storage. When the data structure 900 is initialized, the resource (e.g., computer) that initializes/generates the data structure 900 may allocate an amount of memory to the data structure. The data structure may be initialized or instantiated by an application, such as the match engine of an exchange computing system.

In the example of FIG. 9A, the key array 902 is allocated 8 buckets or memory positions, each of which can store a data element (e.g., key). (It should be appreciated that object array 904 has also been allocated 8 buckets or memory positions, each of which can store a data object corresponding to a key stored in the key array 902.) Pointer P indicates the position where the next (first) data element will be stored upon receipt. The state array 906 may initially be blank, or may include all zeroes to indicate the corresponding position (based on the index, shown below the key array 902, object array 904 and state array 906) in the key array 902 is empty/void.

The cluster array 908 includes one cluster C1, which is not yet associated with a cluster code, because the key array 902 (and the object array 904) does not contain any data elements. The length 910 of the key array 902 is initially zero because no data elements/keys have been stored in the key array 902. The capacity 912 is 8 because 8 buckets/slots of memory have been allocated to the key array 902. In other words, 8 order IDs and their corresponding records can be stored in data structure 900. As described below, the application may request more memory capacity if needed. Memory is typically a shared resource in a computing system, e.g., other applications running on the resource also need memory, and as such the data structure 900 should be configured to use the allocated memory efficiently. If an application utilizing the data structure uses too much memory/system resources, the application or some other application may crash, freeze, hang, etc.

Figure 9B:
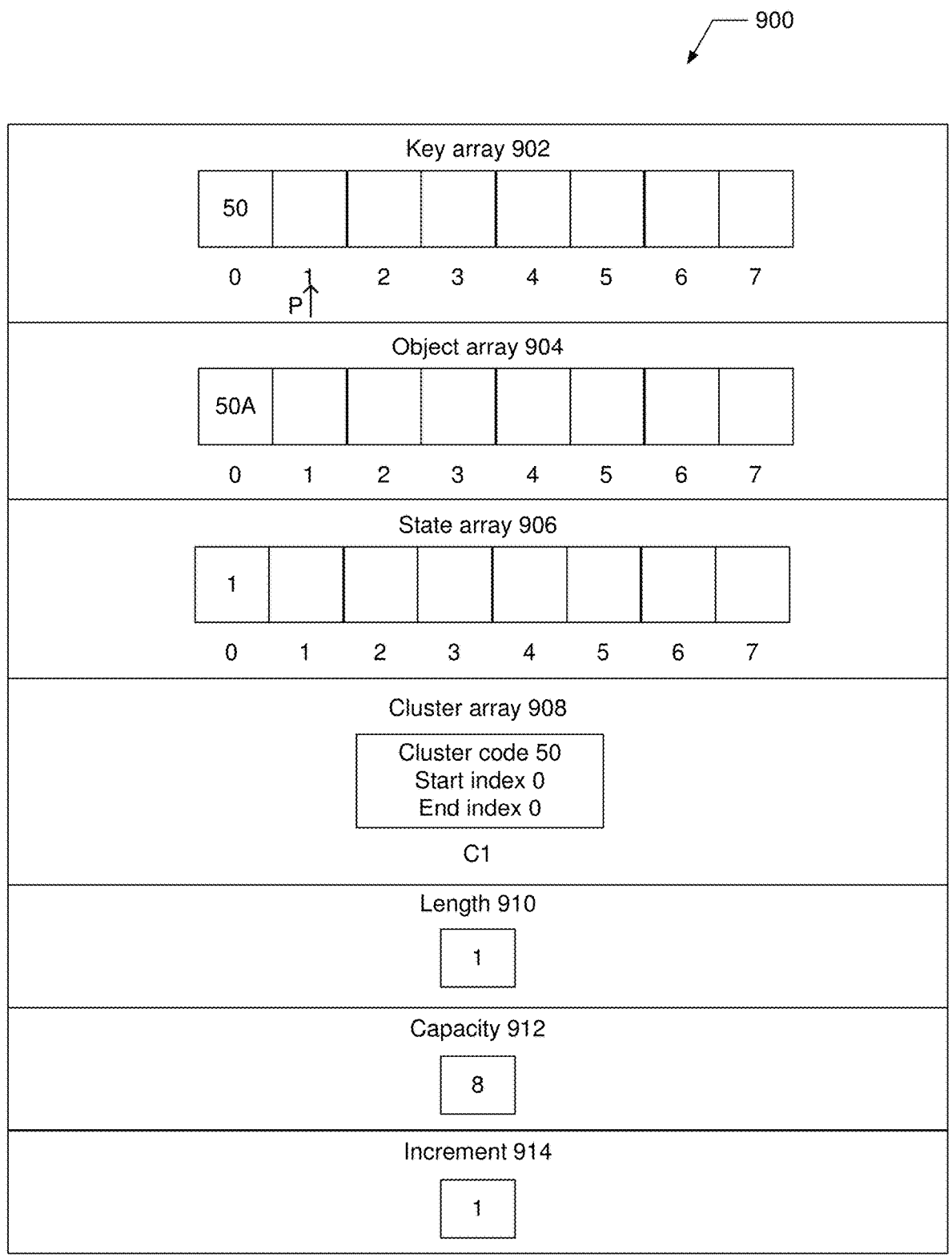

FIG. 9B illustrates data structure 900 after a key 50 (a data element) has been stored in index 0 in the key array 902. The key may be stored implementing method 600 described above. The data structure 900 receives key 50 (e.g., step 602), and stores the key in the next available position (e.g., step 604), which is index 0. The point P is positioned under index 1 of key array 902 to indicate that index 1 is the next position where new data elements will be stored, an object 50A associated with key 50 is stored in index 0 of the object array 904, the state array 906 is updated with a "1" in the index 0 position to indicate that the corresponding index in key array 902 contains a data element. It is determined whether the key is continuous with previously received data, if any (e.g., step 606). In one embodiment, the data structure may create a cluster element when the first key is added to a data structure. A first key added to a data structure may be considered to be non-continuous, and the cluster array may be updated (e.g., step 610) based on the newly created cluster element. The cluster array 908 includes one cluster C1 with a cluster code of 50 (based on equation 2 above, i.e., cluster code=key minus key index=50 minus 0), and is associated with a start index 0 (which is the index of the first data element in the key array). Cluster C1, which only contains one data element, is also associated with an end index of 0. In one embodiment, an end index for a cluster may not be specified until a next cluster's start index is specified. The length 910 of data structure 900 is updated to 1 because there is now one element (50) in the key array 902 (e.g., step 608). The system may then perform the checks described in the steps 612, 614, 616 and 618 as needed.

Figure 9C:
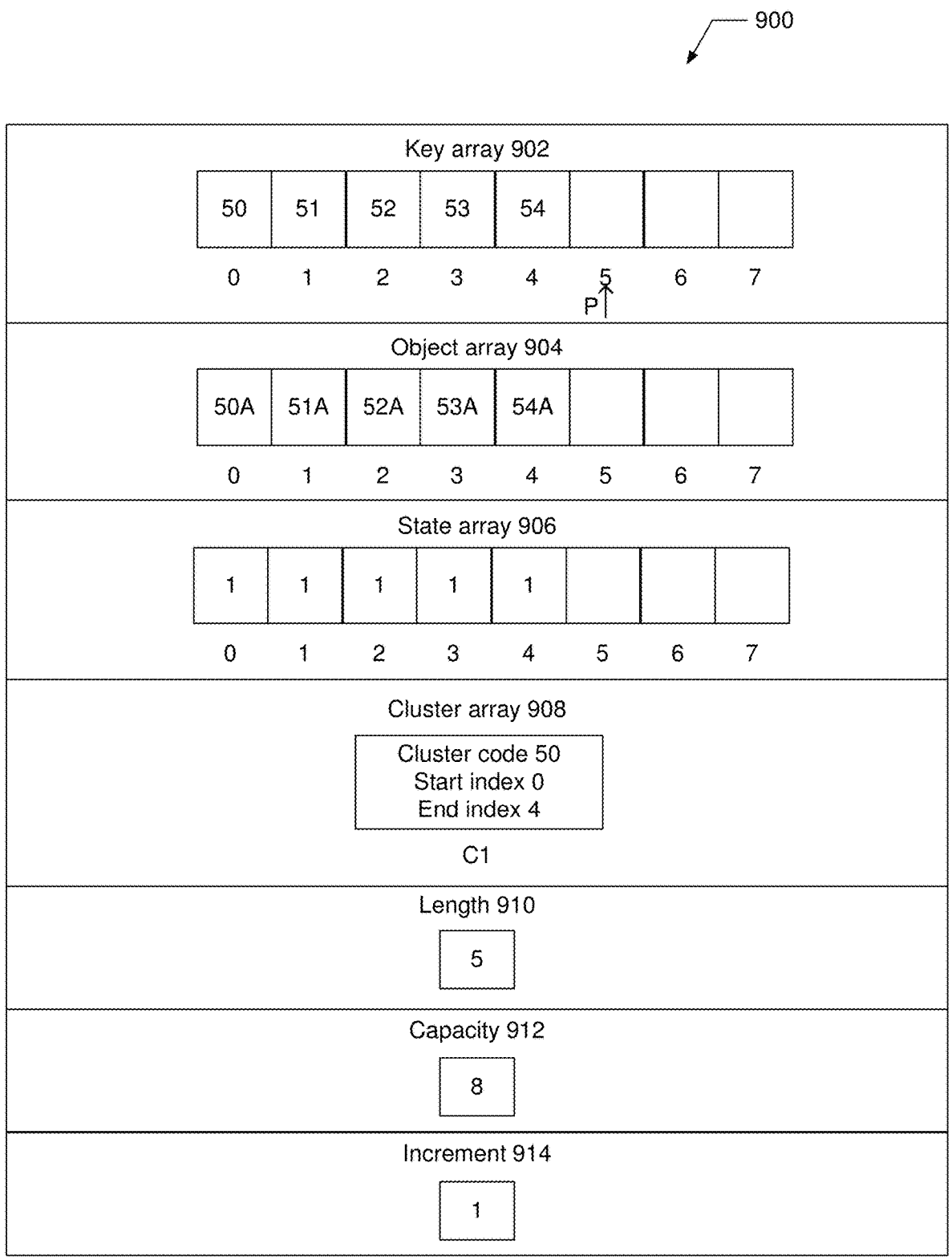

FIG. 9C illustrates a state of data structure 900 after four more keys/data elements 51, 52, 53 and 54 have been stored in the key array 902. The keys may be stored implementing method 600 described above. As shown in FIG. 9C, the key array 902 contains keys 50, 51, 52, 53 and 54. All of the data elements in key array 902 are continuous, based on the increment 914 (specified as 1) of the data being stored. In particular, 51 is 50 incremented by 1, 52 is 51 incremented by 1, 53 is 52 incremented by 1, and 54 is 53 incremented by 1. The cluster array 908 accordingly contains one cluster C1, which is associated with a start index of 0 and an end index of 4. The object array 904 contains the object/records 50A, 51A, 52A, 53A and 54A associated with keys 50, 51, 52, 53 and 54, respectively. The state array 906 includes integer 1 in the indices corresponding to the indices of the key array 902 that contain data elements. The length 910 has been updated to 5 because of the five data elements that are stored in the key array 902.

Figure 9D:
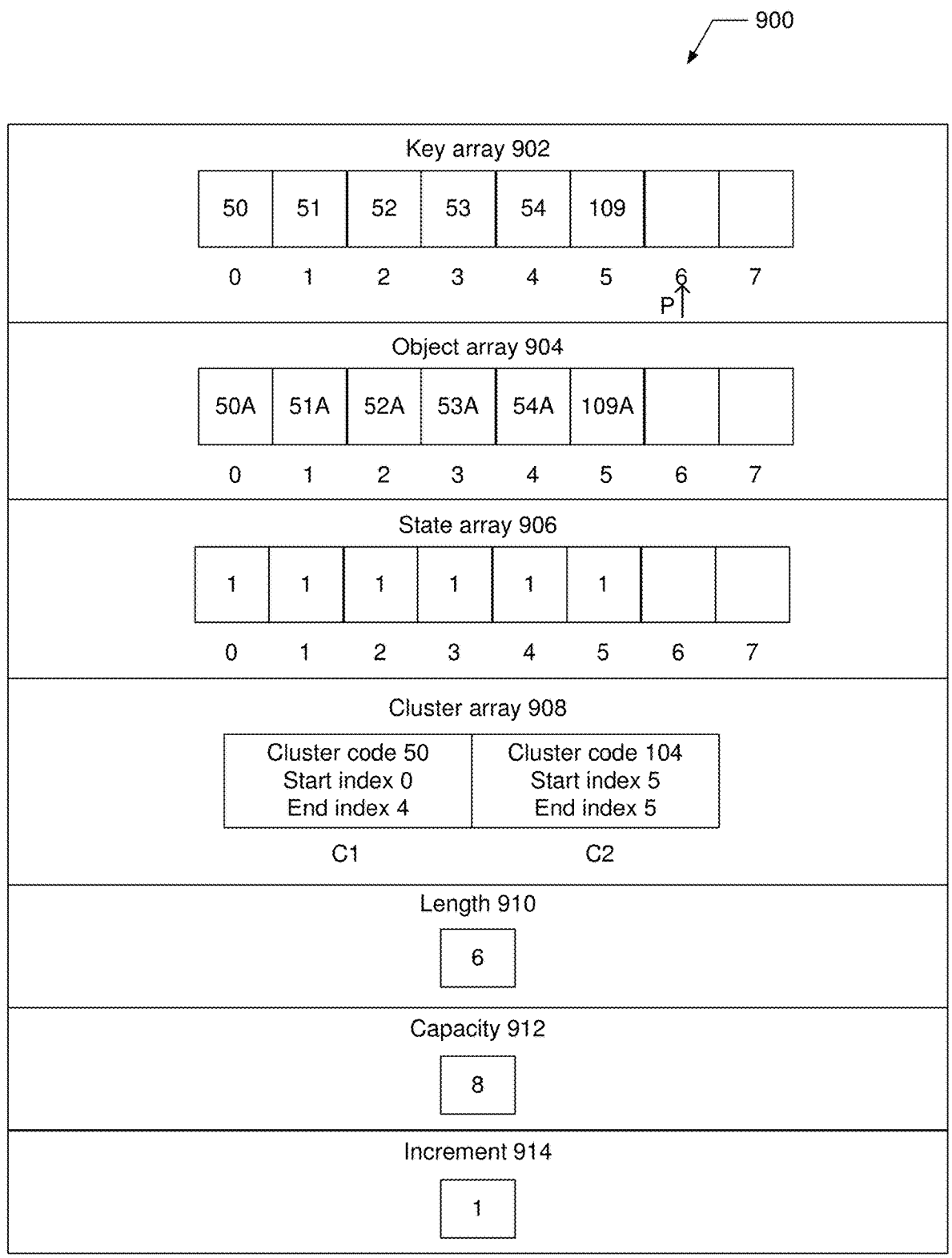

FIG. 9D illustrates data structure 900 after key 109 has been stored in the key array 902, and corresponding object 109A has been stored in the object array 904. Again, the key may be stored implementing method 600 described above. As before, the pointer P, the state array 906, and the length 910 are updated based on the addition of data element/key 109 to the key array 902. As noted above, the increment 914 has been set to 1. End index for cluster C1 is set to 4, because the last data element/key for cluster C1 is in the index 4 position of key array 902. The data structure determines that key 109 is not continuous with the most recent key stored in the key array 902, namely, key 54 (i.e., 109 is not 54 incremented by 1). The data structure accordingly generates a new cluster C2, which is stored in the cluster array 908. The cluster code for cluster C2 is determined based on equation 2, namely, cluster code C2=key 109 minus key position 5=104. The start index is based on the position of the first key in C2, namely, index 5. End index is 5 because cluster C2 last (only) data element is located at index 5.

In one embodiment, the end index for a cluster may only be specified when a next cluster is generated, i.e., a data element is received that is not continuous with a previously received/stored data element that is part of that cluster, or if no new data elements are received for a predetermined amount of time (which may be referred to as a data receive timeout).

Figure 9E:
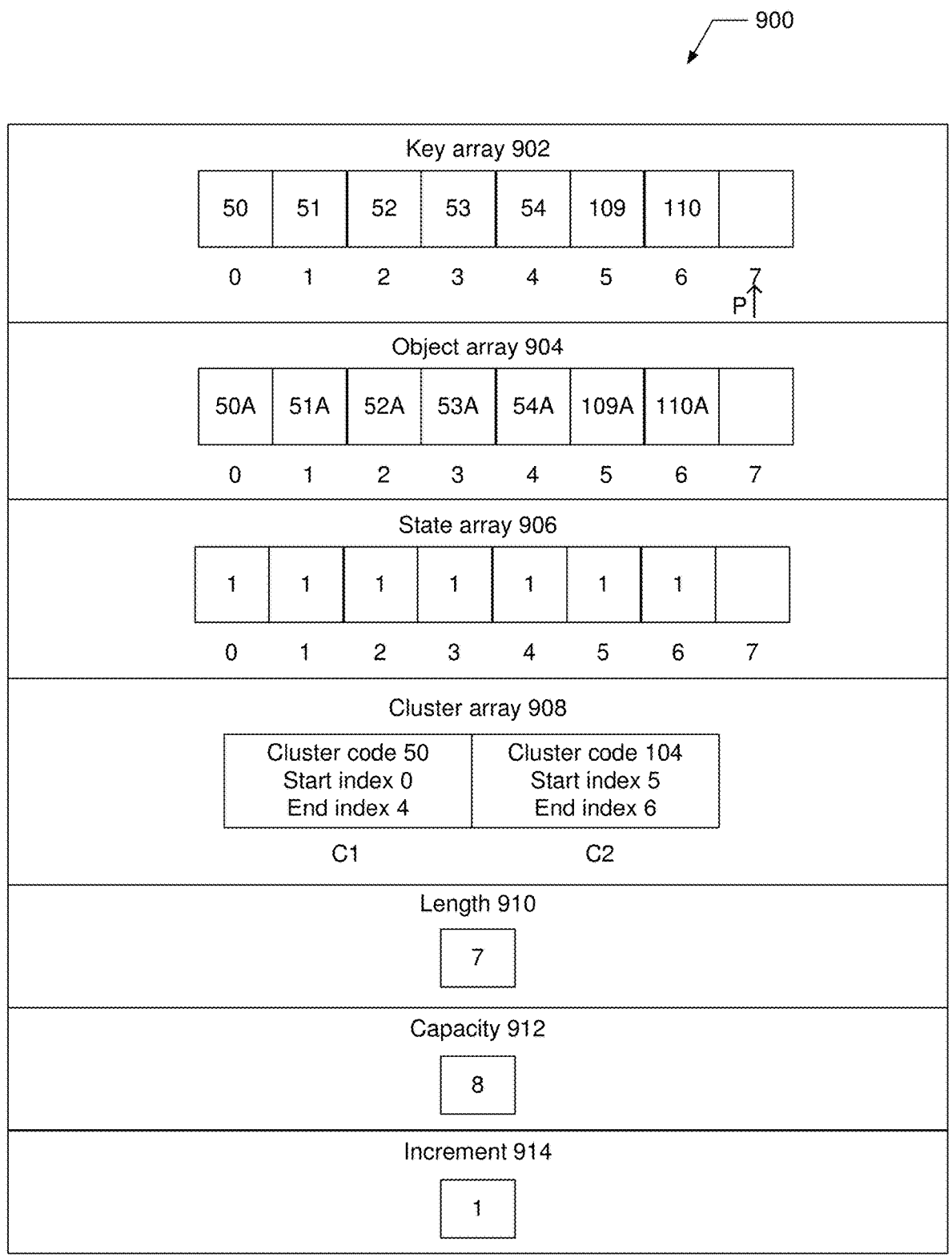

FIG. 9E illustrates data structure 900 after data element/key 110 has been stored in the key array 902, and corresponding object 110A has been stored in the object array 904. Again, the key may be stored implementing method 600 described above. As before, the pointer P, the state array 906, and the length 910 are updated based on the addition of data element/key 110 to the key array 902. Because key 110 is continuous with key 109 (i.e., key 109 incremented by the increment 1 (specified in increment field 914) is key 110), there is no need to create another cluster. Instead, key 110 is added to cluster C2, and the end index of cluster C2 is specified as 6 (which is the index of the last data element associated with cluster C2).

An application may access one of the keys stored in the key array 902. For example, if the keys are order IDs for an exchange computing system, a trader may wish to look up information associated with a previously placed order ID. The order ID accordingly may be a key stored in the key array 902 that needs to be looked up/retrieved. For example, key 110 may be retrieved method 700 described above. An application may request the data structure to check whether key 110 exists in the key array 902 (e.g., step 702), or to retrieve a record 110A associated with key 110. It is determined how many clusters are stored in the cluster array 908 (e.g., step 704). There are two clusters, C1 and C2, which may be stored as a sorted array (ordered numerically). For cluster C1, the cluster code is 50 and the start index is 0. The system can accordingly determine that the first key stored in cluster C1 is the cluster code plus the start index, namely, 50. For cluster C2, the cluster code is 104 and the start index is 5. The system can accordingly determine that the first key stored in cluster C2 is the cluster code plus the start index, namely, 109. The system can also determine the range of keys stored in a cluster based on the end index of the cluster and/or the start index of the next cluster. Based on the range of continuous keys stored in each cluster (where the clusters themselves are discontinuous with each other), the system can determine that lookup key 110 is part of cluster C2 (e.g., step 708). Upon subtracting the cluster code of cluster C2 from lookup key 110 (e.g., step 706) to determine the index of the lookup key, the data structure can return the data element stored in index 6 of the key array (e.g., step 710).

Figure 9F:
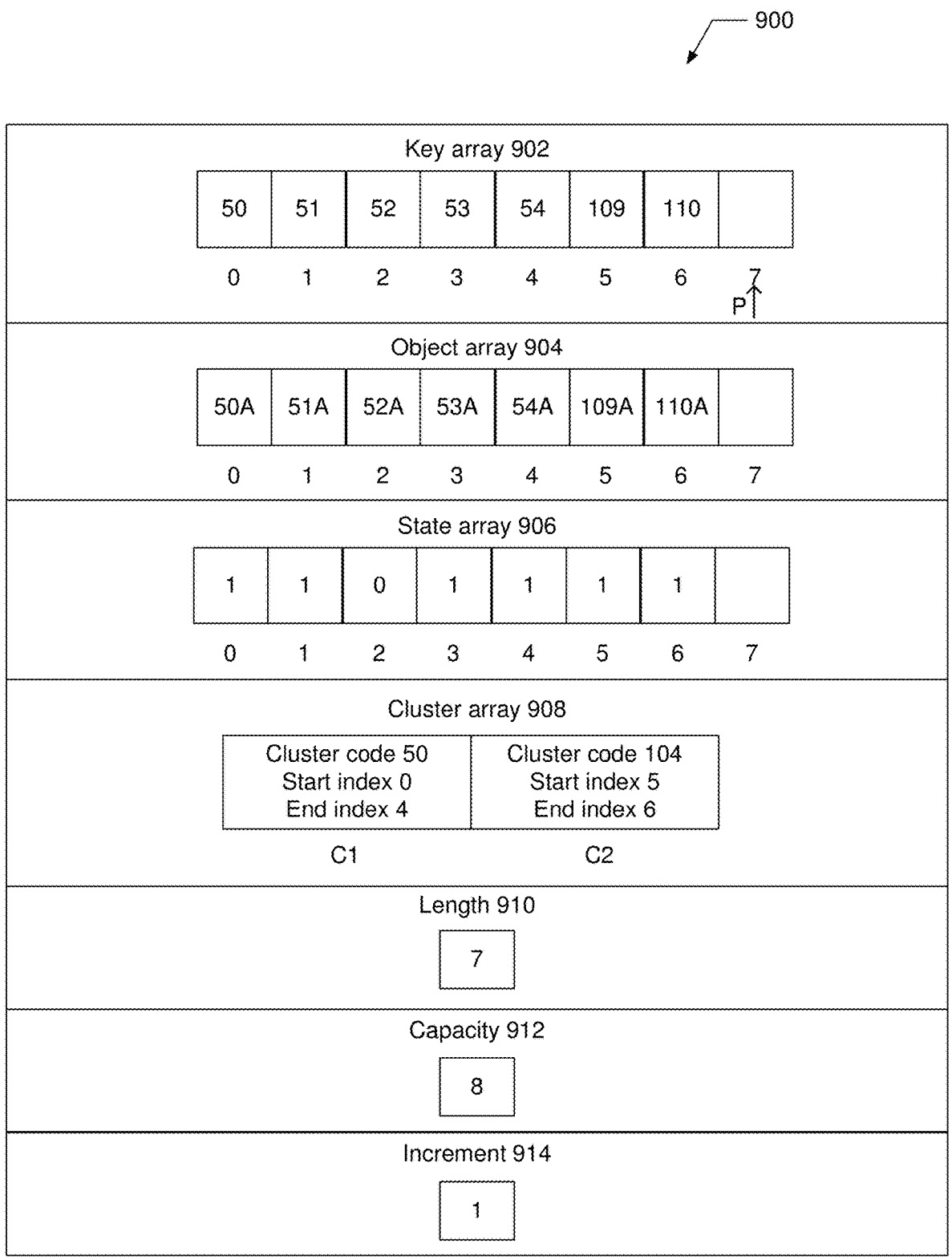

FIG. 9F illustrates data structure 900 after a deletion has been performed, or a key has been marked as garbage/to be deleted. In particular, the index associated with key 52 (specifically, index 2 in the key array) has been set to "0" in the state array 906. The key may be deleted implementing method 800 described above. For example, if the keys are order IDs for an exchange computing system, a trader may wish to delete a previous order, and do so by specifying that the previous order ID and its corresponding order be deleted. The order ID accordingly may be a key stored in the key array 902 that needs to be deleted.

An application may request the data structure to delete key 52 (e.g., step 802). It is determined how many clusters are stored in the cluster array 908 (e.g., step 804). There are two clusters, C1 and C2, which may be stored as a sorted array (ordered numerically). For cluster C1, the cluster code is 50 and the start index is 0. The system can accordingly determine that the first key stored in cluster C1 is the cluster code plus the start index, namely, 50. For cluster C2, the cluster code is 104 and the start index is 5. The system can accordingly determine that the first key stored in cluster C2 is the cluster code plus the start index, namely, 109. The system can also determine the range of keys stored in a cluster based on the end index of the cluster and/or the start index of the next cluster. Based on the range of continuous keys stored in each cluster (where the clusters themselves are discontinuous with each other), the system can determine that deletion key 52 is part of cluster C1 (e.g., step 808). Upon subtracting the cluster code of cluster C1 from deletion key 52 (e.g., step 806) to determine the index of the deletion key, the data structure can set the index in the state array 906 corresponding to the index of the deletion key in the key array 902 (index 2) to "0", or as void/to be deleted (e.g., step 810).

The pointer P does not change position simply because key 52 has been deleted. A new data element that is added to the key array 902 will be added at index 7. The length 910 of the key array 902 also does not change, because the key array 902 still reserves/occupies the same amount of memory as before key 52 was requested to be deleted.

It should accordingly be understood that a cluster may be a logical grouping of data elements, and that data from different clusters (e.g., key 54 in C1 and key 109 in C2) may be adjacently stored (e.g., indices 4 and 5, respectively) in the object array. In other words, the disclosed embodiments may include clusters of continuous data, where each cluster is discontinuous with other clusters, where whether or not data elements are continuous is based on the increment associated with the data being stored in the data structure. The clustering of the data structure enables faster lookup and storage of data elements in the key array.

As the length 910 of the key array 902 approaches capacity 912, there may be a need to either increase the memory allocated to the data structure 900, or to reclaim unused space (e.g., garbage or voids caused by data deletion) from within the key array 902. The data structure 900 may be configured to either increase the memory or reclaim unused space by reclustering, as described herein, when the length to capacity ratio exceeds a predetermined threshold, e.g., 80%. Referring back to FIG. 9F, the length to capacity ratio of data structure 900 in FIG. 9F is 7 divided by 8, or 87.5%, which is greater than the 80% threshold. Accordingly, the system reclusters the data elements in the key array 902. (Because the ratio exceeded 80% at a state described by FIG. 9E, the reclustering described next would have actually been performed after key 110 was added to the key array 902, before key 52 was deleted from the key array 902. However, for purposes of demonstrating the reclustering, the state in FIG. 9F is assumed to be arrived at independently of FIGS. 9A-9E.)

As described throughout the present disclosure, a data cluster is defined by a special cluster code that enables rapid key access, as well as a start index and an end index. In some embodiments, the end index of a cluster may be updated as new continuous elements are added to the cluster. Reclustering a cluster array involves specifying more clusters for a data set, which enables the data structure to write data over void/garbage data. In one embodiment, reclustering a cluster array that includes clusters of data elements (e.g., keys) involves copying only the non-void/non-garbage data elements into a new array, and defining clusters where each cluster corresponds to continuous data within the array. All voids (based on the state array) in the key array are eliminated, resulting in more usable space/memory for the data structure. In one embodiment, reclustering a cluster array involves shifting data elements within the same key array to reclaim void spaces and defining the clusters based on the positions of continuous data.

Because reclustering a cluster array may involve copying all of the non-void data elements (e.g., non-void keys) into a new data element array (e.g., key array), redefining cluster codes and start and end indices for each cluster, and generating new clusters, it should be understood that reclustering may be a computationally expensive process, and which is only performed sparingly when the conditions described herein (e.g., cannot increase the capacity of the array, when the ratio of void data to non-void data exceeds a predetermined threshold) are met. Moreover, reclustering the key array results in more clusters in the cluster array, thereby potentially increasing the number of cluster nodes that need to be searched when performing a data element lookup/deletion.

Figure 10A:
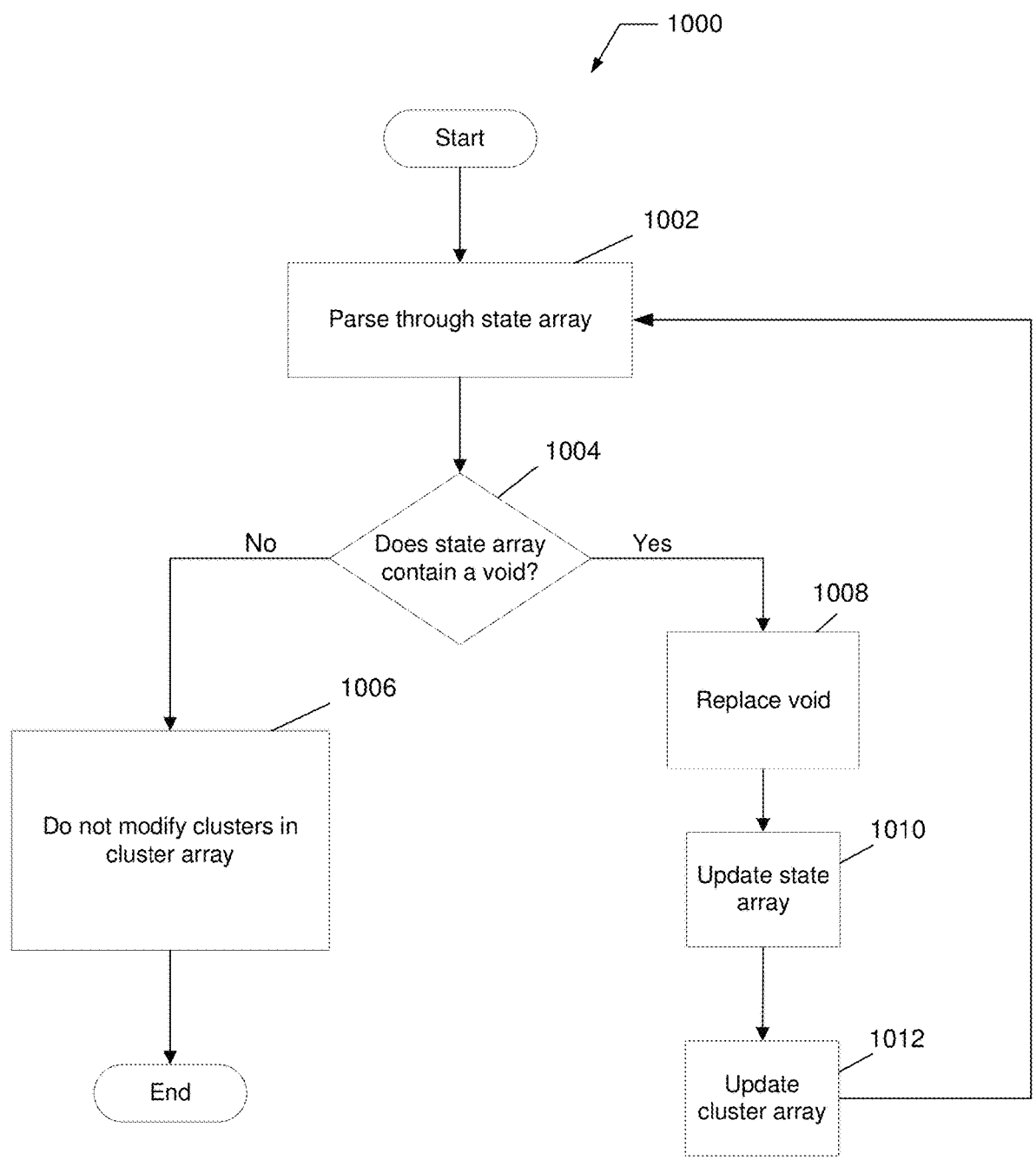
FIG. 10A illustrates an example flowchart for reclustering a data structure, according to some embodiments.

FIG. 10A illustrates an example flowchart 1000 for reclustering data elements in a data structure according to an embodiment of the present disclosure. At step 1002, the state array is parsed, beginning with the first index in the state array, to check the contents of each index in the state array. At step 1004, it is determined if an index in the state array contains a void. If the state array does not indicate any void within any of the cluster(s) (e.g., none of the data elements were deleted after being stored in the key array 902, and the state array does not contain any "0" as described above), the cluster(s) are not modified (step 1006).

If however the state array contains a void (e.g., set to "0" as described above), the void index is replaced with a valid/non-void data element (step 1008). Thus, the data structure reclaims the memory/index that was previously storing void data. For example, all of the data elements that are continuous and do not contain a void may be copied to a new array. The state array is then updated with a "1" to reflect that the previously void index now contains a valid/non-void data element (step 1010).

It should be appreciated that the data element in the previously void index will be discontinuous with preceding data in the array. Accordingly, the clusters in the cluster array are redefined so that each cluster only contains continuous data elements (step 1012).

Method 1000 continues parsing through the state array to detect voids (return to step 1002). Method 1000 is accordingly repeated until the clusters in the cluster array are redefined to remove voids/gaps in the key array, and the space of the voids is reclaimed by the data structure (either by copying the data elements into a new key array, or by shifting data elements within the same key array).

In one embodiment, the method 1000 may store the results of the reclustering (e.g., the attributes such as cluster code, start index and end index of the new data clusters) in a buffer or separate array, and remove all the voids simultaneously by copying the entire key array except the detected voids into a new array.

Figure 10B:
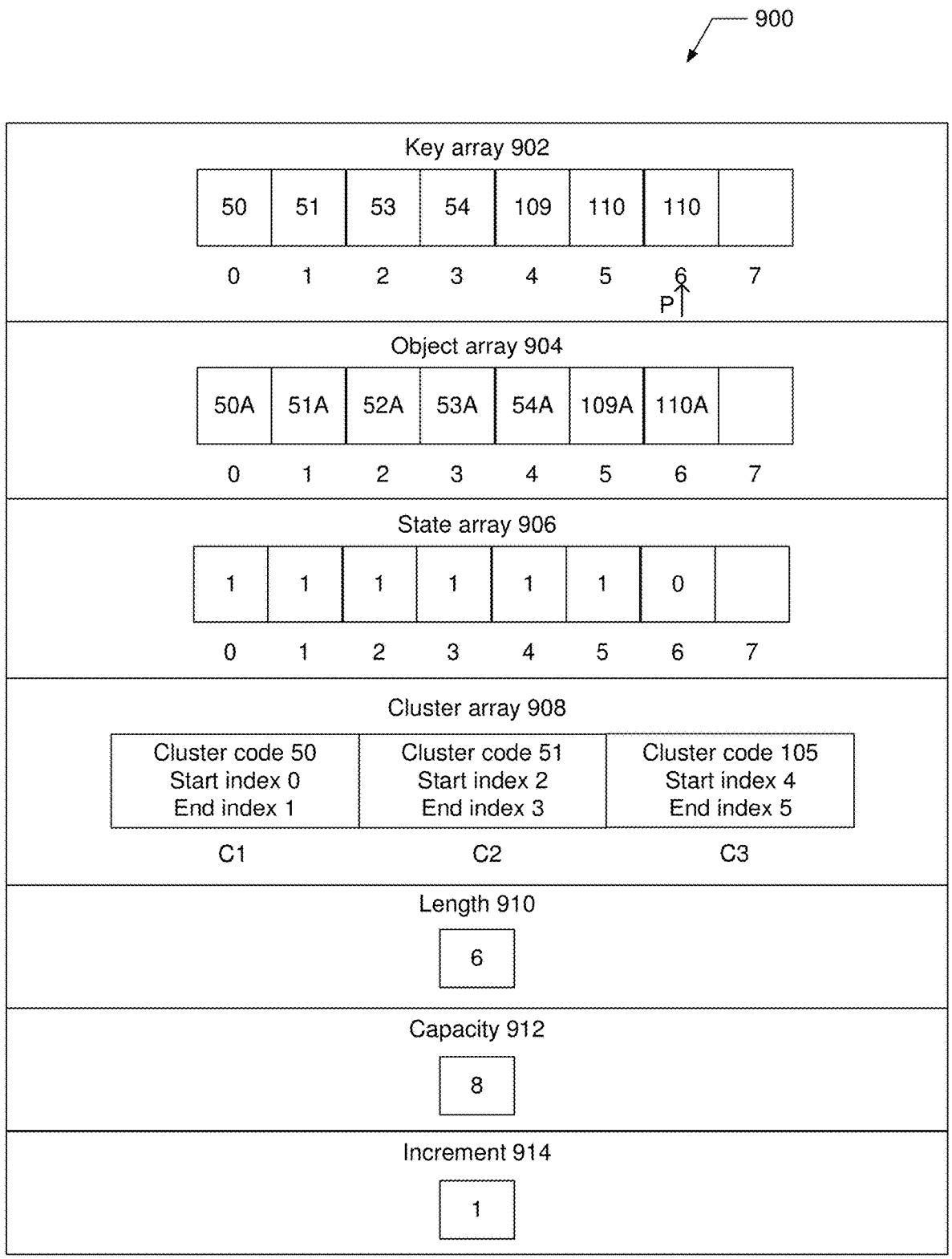

FIG. 10B illustrates data structure 900 after reclustering the data structure 900 shown in FIG. 9F, which may be performed implementing method 1000 described above. The state array 906 in FIG. 9F is parsed (e.g., step 1002). Void/gap at position 2 in the state array 906 is detected (e.g., step 1004). Accordingly, the void is replaced with the next data element in the key array 902, i.e., index 2 in the key array 902 is now occupied by the data element/key 53 which was previously in index 3 (e.g., step 1008). The state array is updated to reflect that the key array 902 now contains a key in index 2 (specifically, key 53) (e.g., step 1010). The state array is also updated to reflect that the data element in index 6 is void. The pointer P indicates that the next available location is index 6, i.e., the next data element received can over-write the date in index 6.

The clusters in the cluster array are updated because there is a discontinuity in data elements going from index 1 to index 2. In particular, the end index of cluster C1 is updated to be 1. The cluster code, start index and end index of cluster C2 are updated as shown in FIG. 10B. Cluster element C3 is added to the cluster array 908, with the cluster code, start index and end index as shown in FIG. 10B.

Unlike many common data structures that hash data, the disclosed embodiments provide a constant insertion time. In particular, a hashing storage technique may generate a hash from a key to be stored, and then perform a modulo operation on the hash by the number of indices in the data array to determine the index where the key should be stored. For example, a key of 150 may be hashed to 50 (using a hash function), and a modulo operation (the remainder after division of one number by another) may then be performed over the number of positions in the data array, i.e., 50 modulo 8 is 2 (remainder after 50 is divided by 8). Thus, the key is stored in position 2. Whenever another key needs to be stored, the same hash function/modulo function is performed. If the result for another key is determined to be position 2 (collision), then the key is stored in the next open position (linear probe), resulting in an unpredictable insertion time. Similarly, for lookups, hashing a key/performing a linear probe can require an unpredictable amount of time. If there are many keys already stored in the data structure, there can be a high number of collisions when inserting or looking up data. Because the number of collisions is unpredictable/unknown (it depends on the state of the array when a key is to be inserted/accessed), the performance of the data structure becomes unpredictable.

The disclosed clustering data structure increases the predictability of storing/accessing data in a data structure by avoiding collisions, and also by minimizing the amount of searching that needs to be performed. For example, when the data is ever-increasing data, each new data element can be inserted into a position in its array referenced by the array pointer described above. Accordingly, inserting data advantageously becomes a constant time/complexity transaction.

It should be appreciated that the insertion step may be referred to as requiring constant time/complexity, even though different insertions may slightly vary in the amount of time required. For example, referring to FIG. 6, step 602 and 604 should typically require the same amount of time for each insertion. If an insertion triggers some of the additional operations described in steps 618 or 616, then the insertion process for different key s may vary, but the actual insertion of keys in to the key array should require constant or close to constant (negligible differences) time.

The disclosed embodiments also provide advantages when accessing data in the data structure. When data elements in an array are in one cluster (e.g., the cluster array only includes one cluster), lookup/deletion instructions require a constant/predictable amount of time, because the cluster code is simply subtracted from the lookup/deletion key, as described above in connection with FIGS. 7 and 8.

Even when data elements in an array are in multiple clusters, the time delay/variability for accessing data is optimized. In particular, when an array contains N elements that are clustered into M clusters (i.e., N is greater than or equal to M), the lookup/deletion performance varies based on the number of clusters M, and not on the number of data elements N stored in the data array. Thus, even the worst case performance scenario would only become a function of M, not N, because the time variability is due to locating the correct cluster where the lookup/deletion key is stored. Once the lookup/deletion key's cluster is identified, the lookup/deletion instructions require a constant/predictable amount of time, because the cluster code is simply subtracted from the lookup/deletion key, as described above in connection with FIGS. 7 and 8.

It should accordingly be appreciated that the disclosed data structure reduces the uncertainty/unpredictability around data insertion and lookups. In many applications involving high speed electronic trading, variability in data insertion and lookups may be considered more undesirable than latency. In other words, a constant, predictable performance of 0.5 microseconds may be more desirable (e.g., to traders or other users of an exchange computing system) compared to unpredictable performance that varies from 0.45 microseconds to 0.55 microseconds.

If the keys are assumed to be ever increasing, such as order IDs generated by an exchange computing system match engine, then data insertion performance will be constant (unless the key array needs to be copied or reclustered) because keys are inserted at the next available position and the data structure information such as length and cluster array are updated. These steps would require the same amount of computational cycles for each insert, and therefore lead to predictable performance. Reclustering is computationally expensive, and is accordingly performed sparingly, e.g., when the length to capacity ratio exceeds a predetermined threshold, which is configurable by an administrator of the data structure.

Data lookups and deletions can also be performed in constant time if there is only one cluster (which depends on the keys actually generated by the application). If there are multiple clusters, the disclosed data structure is still optimized to retrieve/delete a key efficiently, and in many cases these actions may approach or reach constant performance time. For example, even in a large data set containing N keys, if the data set is clustered into M clusters in the disclosed data structure, where M is much smaller than N, e.g., many of the order IDs are sequential/incremental, then identifying the correct cluster (based on a comparison of the target key being looked up or deleted and the cluster code) becomes a function of M, not a function of N.

Figure 11:
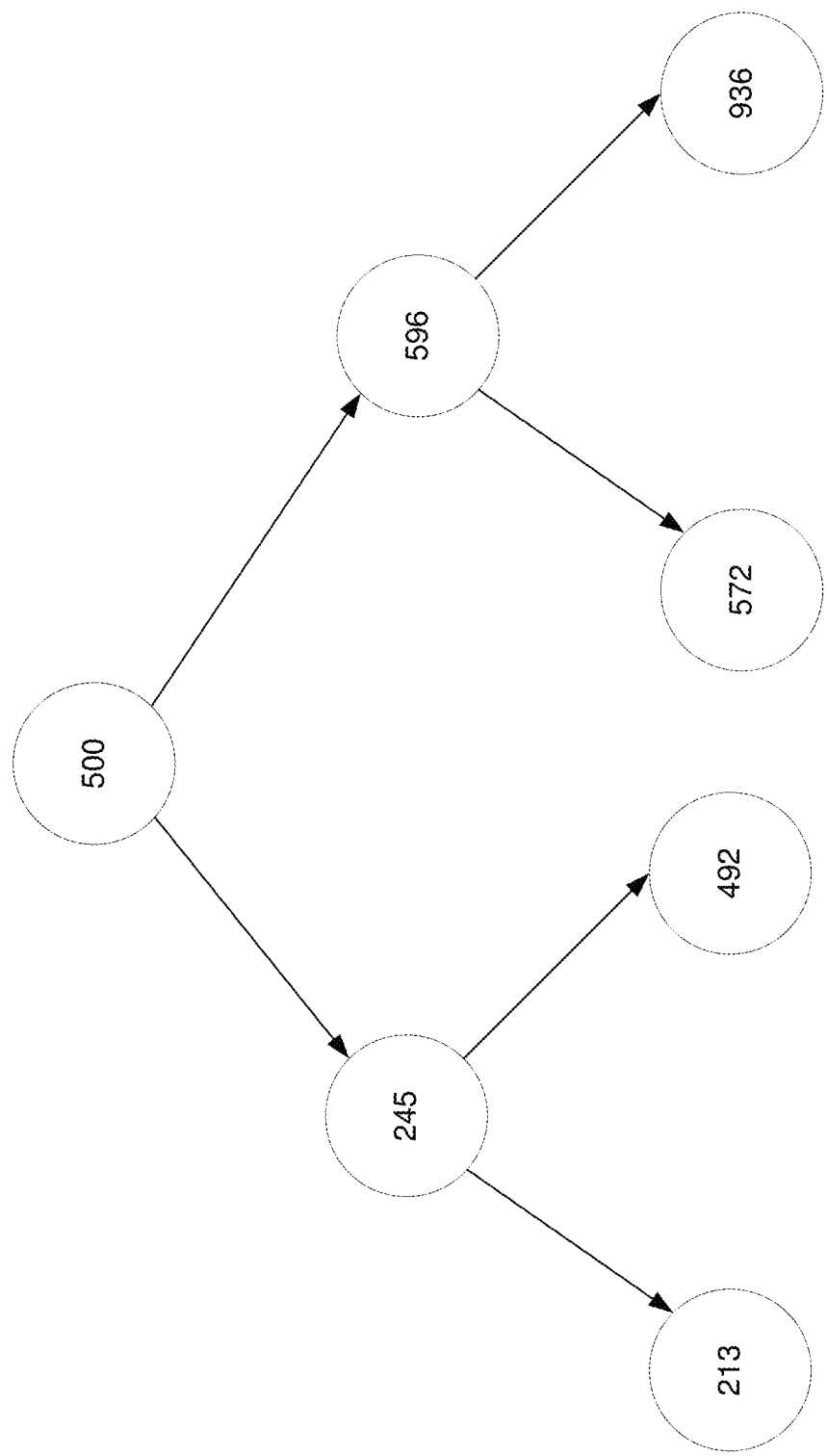
FIG. 11 illustrates an example binary tree representing an example cluster array, according to some embodiments.

FIG. 11 illustrates an example binary tree graph 1100 where each node is the first key stored in a cluster, i.e., the cluster code plus start index for that cluster, in an example cluster array of the disclosed data structure. As can be seen, the keys range from 213 to at least 936. For example, the data structure may store 500 different keys ranging from 213 to 1015, clustered in 7 clusters, where the clusters have nodes (which again is a cluster code plus the start index for that cluster) of 213, 245, 492, 500, 572, 596 and 936. The time/computational expense of looking up/deleting any of the keys stored in the corresponding data structure becomes a function of the number of clusters. For example, if an application requests a lookup of key 263, the data structure would compare 263 to node 500, traverse to the left (lower) side of node 500 to node 245 because 263 is less than 500, compare 263 to node 245, traverse to the right (higher) side of node 245 to node 492 because 263 is greater than 245, and determine that key 263 is in the cluster associated with node 245. The performance to identify the correct cluster can vary based on the number of clusters in the data structure. Notably, the performance does not depend on the number of data elements in the data structure, just on the number of clusters in the data structure.

Once the correct cluster is located, the performance of the data structure is constant. As described above the disclosed clustering data structure offers constant access time once the correct cluster is located, or if there is only one cluster in the data structure. In particular, the data structure can quickly and predictably (performance wise) locate the index in the key array where 263 is stored by subtracting the cluster code of the identified cluster (where the cluster code is the first key of the cluster minus the index of that key) from 263 (the lookup/deletion key).

The disclosed clustering data structure accordingly provides improvements in both the insertion performance time as well as access (lookup/deletion) performance time. Regarding insertions, the best case and worst case scenarios are constant performance times. Regarding data access, the best case may be constant performance time (e.g., when there is only one cluster element in the cluster array) and the worst case may be logarithmic performance time, e.g., a function of the number of cluster elements. Importantly, the worst case scenario for data access is proportional to the number of cluster elements M, not the number of data elements N, where N is greater than M. Many systems that have a logarithmic performance time for data access (lookup/deletions) experience a performance time that is a function of, or proportional to, the number of data elements N. Accordingly, implementing the disclosed data structure also reduces the time, and improves the latency, for performing data lookups/deletions.

Therefore, the disclosed data structure and associated systems and methods provide various important performance improvements.

The disclosed embodiments include an apparatus for performing the methods described herein. In one embodiment, the disclosure includes a data storage and retrieval system for a computer memory, where the memory is configured according to the disclosed data structure, e.g., a clustering data structure as described herein.

In one embodiment, a computer implemented method for storing and retrieving data elements in a computer memory comprises: configuring, by a processor, the computer memory according to a data structure, the data structure including: a data element array including a plurality of sorted data elements, each data element associated with a position in the data element array; and a cluster element array including one or more cluster elements, each cluster element defined by one of one data element from the data element array or a plurality of continuous data elements from the data element array, wherein each cluster element is associated with a cluster code that correlates each data element defining the cluster element with the position of the data element in the data element array.

In one embodiment, the data elements may be keys, and the data element array may be a key array.

In one embodiment, the method further comprises receiving, by the processor, a data element for storage; storing, by the processor, the data element in a next available position in the data element array; upon determining, by the processor, that the received data element is not continuous with a data element previously stored in a position adjacent to the position where the received data element was stored, updating, by the processor, the cluster element array with a cluster element associated with a cluster code that correlates the received data element with the position of the received data element in the data element array, so that each cluster element in the cluster element array is defined by one of one data element from the data element array or a plurality of continuous data elements from the data element array; and upon determining, by the processor, that the received data element is continuous with a previously stored data element previously stored in a position adjacent to the position where the received data element was stored, updating, by the processor, the cluster element in the cluster element array defined by the previously stored data element.

In one embodiment, the method further comprises: receiving, by the processor, a request to search for a target data element; upon determining, by the processor, that the cluster element array contains exactly one cluster element, determining, by the processor, the position of the target data element in the data element array based on a difference between the target data element and the cluster code of the cluster element; and upon determining, by the processor, that the cluster element array contains more than one cluster element: searching, by the processor, through a sorted list of nodes to determine the cluster element defined by the target data element, each node associated with the cluster code of a cluster element in the cluster element array; and determining, by the processor, the position of the target data element in the data element array based on a difference between the target data element and the cluster code of the determined cluster element.

Figure 12:
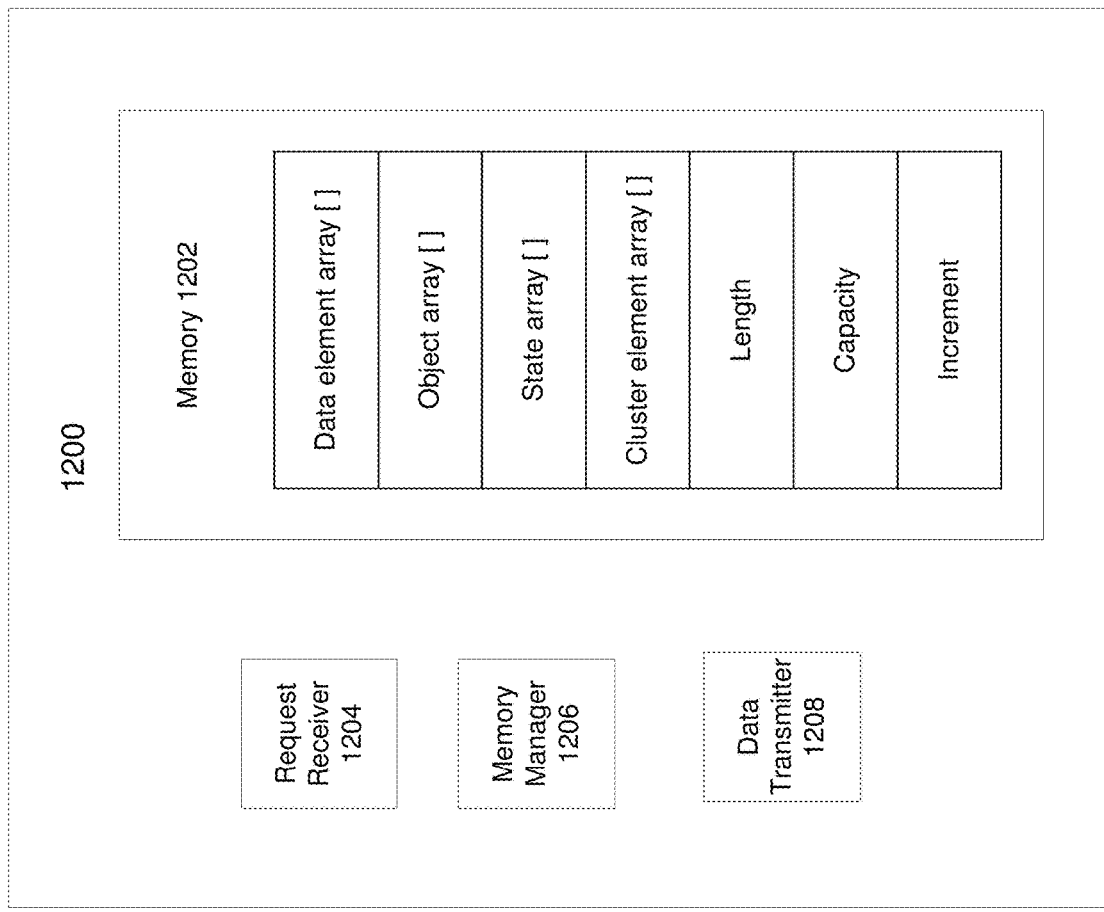
FIG. 12 depicts a block diagram of a data storage and retrieval system, according to some embodiments.

FIG. 12 depicts an illustrative embodiment of a system 1200 including a memory 1202, a request receiver 1204, a memory manager 1206, and a data transmitter 1208. The memory 1202 may be configured according to a data structure, e.g., data structure 500 described above, and may comprise a data element array for storing a plurality of data elements; an object array; a state array corresponding to the data element array, each position of the state array indicating whether a corresponding position in the data element array contains void data; and a cluster element array for storing one or more cluster elements, each cluster element defined by one of one data element from the data element array or a plurality of continuous data elements from the data element array, wherein each cluster element is associated with a cluster code correlating each data element defining the cluster element with the position of the data element in the data element array.

The request receiver 1204 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the request receiver 1204 to, or otherwise be operative to, receive: requests to store data elements in the data structure; requests to search for data elements in the data structure; or requests to delete data elements from the data structure.

The memory manager 1206 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the memory manager 1206 to, or otherwise be operative to manage the data structure.

For example, the memory manager may be configured to manage the data structure by, in response to a request received by the request receiver update the cluster element array upon storing a data element in the data element array; search the data element array for a target data element by:

upon determining that the cluster element array contains exactly one cluster element, determining the position of the target data element in the data element array based on a difference between the target data element and the cluster code of the cluster element; and upon determining that the cluster element array contains more than one cluster element: searching through a sorted list of nodes to determine the cluster element defined by the target data element, each node associated with the cluster code of a cluster element in the cluster element array; and determining the position of the target data element in the data element array based on a difference between the target data element and the cluster code of the determined cluster element; and delete a target data element from the data structure by: upon determining, by the processor, that the cluster element array contains exactly one cluster element: determining, by the processor, the position of the target data element in the data element array based on a difference between the target data element and the cluster code of the cluster element; and setting, by the processor, the corresponding position in the state array as void; and upon determining, by the processor, that the cluster element array contains more than one cluster element: searching, by the processor, through a sorted list of nodes, each node associated with the cluster code of a cluster element in the cluster element array, to determine the cluster element defined by the target data element; determining, by the processor, the position of the target data element in the data element array based on a difference between the target data element and the cluster code of the determined cluster element; and setting, by the processor, the corresponding position in the state array as void; and recluster the cluster element array so that each cluster element in the cluster element array is defined by one of one data element from the data element array or a plurality of continuous non-void data elements from the data element array upon determining that the ratio of a number of positions in the data element array containing void data to a number of positions in the data element array containing non-void data exceeds a predetermined threshold.

XIV. Conclusion

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method for storing and retrieving data elements in a computer memory, the method comprising:
    configuring, by a processor, the computer memory according to a data structure, the data structure including:
        a data element array including a plurality of sorted data elements, each data element associated with a position in the data element array, wherein each data element comprises a key;

a cluster element array including one or more cluster elements, each cluster element defined by one of one data element from the data element array or a plurality of continuous data elements from the data element array, wherein each cluster element is associated with a cluster code for determining the position of one or more data elements in the data element array, the cluster code correlating each data element defining the cluster element with the position of the data element in the data element array, wherein the cluster code of each cluster element is determined as a difference between a first data element associated with the cluster element and the position in the data element array where the first data element is stored, wherein the difference is calculated by subtracting the position in the data element array where the first data element is stored from the first data element associated with the cluster element; and wherein the data structure is associated with an increment value, and wherein two data elements adjacently positioned in the data element array are continuous if a subtraction of one of the two data elements adjacently positioned in the data element array from the other of the two data elements adjacently positioned in the data element array is equal to the increment value.

2. The computer implemented method of claim 1, further comprising:

receiving, by the processor, a data element for storage;

storing, by the processor, the received data element in a next available position in the data element array;

upon determining, by the processor, that the received data element is not continuous with a data element previously stored in a position adjacent to the position where the received data element was stored, updating, by the processor, the cluster element array with a cluster element associated with a cluster code that correlates the received data element with the position of the received data element in the data element array, so that each cluster element in the cluster element array is defined by one of one data element from the data element array or a plurality of continuous data elements from the data element array; and upon determining, by the processor, that the received data element is continuous with a previously stored data element previously stored in a position adjacent to the position where the received data element was stored, updating, by the processor, the cluster element in the cluster element array defined by the previously stored data element.

3. The computer implemented method of claim 1, wherein the data structure includes a state array corresponding to the data element array, each position of the state array indicating whether a corresponding position in the data element array contains void data, the method further comprising:

upon determining, by the processor, that a ratio of a number of positions in the data element array containing void data to a number of positions in the data element array containing non-void data exceeds a predetermined threshold, reclustering, by the processor, the cluster element array so that each cluster element in the cluster element array is defined by one of one data element from the data element array or a plurality of continuous non-void data elements from the data element array.

4. The computer implemented method of claim 3, further comprising determining whether the ratio of the number of positions in the data element array containing void data to the number of positions in the data element array containing non-void data exceeds the predetermined threshold after a data element is stored in the data element array.

5. The computer implemented method of claim 3, wherein the data structure reclaims the memory associated with the void data as a result of the reclustering.

6. The computer implemented method of claim 3, wherein a plurality of data elements that previously defined one cluster element defines at least two cluster elements as a result of the reclustering.

7. The computer implemented method of claim 1, further comprising:

receiving, by the processor, a request to search for a target data element;

upon determining, by the processor, that the cluster element array contains exactly one cluster element, determining, by the processor, the position of the target data element in the data element array based on a subtraction of the cluster code of the cluster element from the target data element; and upon determining, by the processor, that the cluster element array contains more than one cluster element:

searching, by the processor, through a sorted list of nodes to determine the cluster element defined by the target data element, each node associated with the cluster code of a cluster element in the cluster element array; and determining, by the processor, the position of the target data element in the data element array based on a subtraction of the cluster code of the determined cluster element from the target data element.

8. The computer implemented method of claim 7, wherein the data structure includes an object array corresponding to the data element array, each position of the object array containing an object corresponding to a data element in the corresponding position in the data element array, the method further comprising accessing, by the processor, an object stored in the object array at the corresponding determined position.

9. The computer implemented method of claim 8, wherein the data elements are order identifiers generated in response to processing electronic data transaction request messages, and the objects are orders corresponding to the order IDs.

10. The computer implemented method of claim 1, wherein the data structure includes a state array corresponding to the data element array, each position of the state array indicating whether a corresponding position in the data element array contains void data, the method further comprising:

receiving, by the processor, a request to remove a target data element from the data element array;

upon determining, by the processor, that the cluster element array contains exactly one cluster element:

determining, by the processor, the position of the target data element in the data element array based on a subtraction of the cluster code of the cluster element from the target data element; and setting, by the processor, the corresponding position in the state array as void; and upon determining, by the processor, that the cluster element array contains more than one cluster element:

searching, by the processor, through a sorted list of nodes, each node associated with the cluster code of a cluster element in the cluster element array, to determine the cluster element defined by the target data element;

determining, by the processor, the position of the target data element in the data element array based on a subtraction of the cluster code of the cluster element from the target data element; and setting, by the processor, the corresponding position in the state array as void.

11. A computer system for storing and retrieving data elements in a computer memory, the computer system comprising:

a processor; and a memory communicatively coupled to the processor, the memory comprising software that, when executed by the processor, performs operations that cause the processor to:

configure, by the processor, the computer memory according to a data structure, the data structure including:

a data element array including a plurality of sorted data elements, each data element associated with a position in the data element array wherein each data element comprises a key; and a cluster element array including one or more cluster elements, each cluster element defined by one of one data element from the data element array or a plurality of continuous data elements from the data element array, wherein each cluster element is associated with a cluster code for determining the position of one or more data elements in the data element array, the cluster code correlating each data element defining the cluster element with the position of the data element in the data element array;

wherein the cluster code of each cluster element is determined as a difference between a first data element associated with the cluster element and the position in the data element array where the first data element is stored, wherein the difference is calculated by subtracting the position in the data element array where the first data element is stored from the first data element associated with the cluster element; and wherein the data structure is associated with an increment value, and wherein two data elements adjacently positioned in the data element array are continuous if a subtraction of one of the two data elements adjacently positioned in the data element array from the other of the two data elements adjacently positioned in the data element array is equal to the increment value.

12. The computer system of claim 11, wherein the software further causes the processor to:

receive a data element for storage;

store the received data element in a next available position in the data element array;

upon determining that the received data element is not continuous with a data element previously stored in a position adjacent to the position where the received data element was stored, update the cluster element array with a cluster element associated with a cluster code that correlates the received data element with the position of the received data element in the data element array, so that each cluster element in the cluster element array is defined by one of one data element from the data element array or a plurality of continuous data elements from the data element array; and upon determining that the received data element is continuous with a previously stored data element previously stored in a position adjacent to the position where the received data element was stored, update the cluster element in the cluster element array defined by the previously stored data element.

13. The computer system of claim 11, wherein the data structure includes a state array corresponding to the data element array, each position of the state array indicating whether a corresponding position in the data element array contains void data, wherein the software further causes the processor to:

upon determining that a ratio of a number of positions in the data element array containing void data to a number of positions in the data element array containing non-void data exceeds a predetermined threshold, recluster the cluster element array so that each cluster element in the cluster element array is defined by one of one data element from the data element array or a plurality of continuous non-void data elements from the data element array.

14. The computer system of claim 13, wherein the software further causes the processor to determine whether the ratio of the number of positions in the data element array containing void data to the number of positions in the data element array containing non-void data exceeds the predetermined threshold after a data element is stored in the data element array.

15. The computer system of claim 13, wherein the data structure reclaims the memory associated with the void data as a result of the reclustering.

16. The computer system of claim 13, wherein a plurality of data elements that previously defined one cluster element defines at least two cluster elements as a result of the reclustering.

17. The computer system of claim 11, wherein the software further causes the processor to:

receive a request to search for a target data element;

upon determining that the cluster element array contains exactly one cluster element, determine the position of the target data element in the data element array based on a subtraction of the cluster code of the cluster element from the target data element; and upon determining that the cluster element array contains more than one cluster element:

search through a sorted list of nodes to determine the cluster element defined by the target data element, each node associated with the cluster code of a cluster element in the cluster element array; and determine the position of the target data element in the data element array based on a subtraction of the cluster code of the determined cluster element from the target data element.

18. The computer system of claim 17, wherein the data structure includes an object array corresponding to the data element array, each position of the object array containing an object corresponding to a data element in the corresponding position in the data element array, wherein the software further causes the processor to access an object stored in the object array at the corresponding determined position.

19. The computer system of claim 18, wherein the data elements are order identifiers generated in response to processing electronic data transaction request messages, and the objects are orders corresponding to the order IDs.

20. The computer system of claim 11, wherein the data structure includes a state array corresponding to the data element array, each position of the state array indicating whether a corresponding position in the data element array contains void data, wherein the software further causes the processor to:
  receive a request to remove a target data element from the data element array;
  upon determining that the cluster element array contains exactly one cluster element:
    determine the position of the target data element in the data element array based on a subtraction of the cluster code of the cluster element from the target data element; and
    set the corresponding position in the state array as void; and
  upon determining that the cluster element array contains more than one cluster element:
    search through a sorted list of nodes, each node associated with the cluster code of a cluster element in the cluster element array, to determine the cluster element defined by the target data element;
    determine the position of the target data element in the data element array based on a subtraction of the cluster code of the determined cluster element from the target data element; and
    set the corresponding position in the state array as void.

21. A data storage and retrieval system for a computer memory, comprising:
  means for configuring the computer memory according to a data structure, the data structure including:
    a data element array including a plurality of sorted data elements, each data element associated with a position in the data element array, wherein each data element comprises a key; and
    a cluster element array including one or more cluster elements, each cluster element defined by one of one data element from the data element array or a plurality of continuous data elements from the data element array,
    wherein each cluster element is associated with a cluster code for determining the position of one or more data elements in the data element array, the cluster code correlating each data element defining the cluster element with the position of the data element in the data element array,
    wherein the cluster code of each cluster element is determined as a difference between a first data element associated with the cluster element and the position in the data element array where the first data element is stored, wherein the difference is calculated by subtracting the position in the data element array where the first data element is stored from the first data element associated with the cluster element; and
    wherein the data structure is associated with an increment value, and wherein two data elements adjacently positioned in the data element array are continuous if a subtraction of one of the two data elements adjacently positioned in the data element array from the other of the two data elements adjacently positioned in the data element array is equal to the increment value.

22. A non-transitory memory configured according to a data structure, the data structure comprising:
  a data element array including a plurality of sorted data elements, each data element associated with a position in the data element array, wherein each data element comprises a key;
  an object array corresponding to the data element array, each position of the object array containing an object corresponding to a data element in the corresponding position in the data element array;
  a state array corresponding to the data element array, each position of the state array indicating whether a corresponding position in the data element array contains void data; and
  a cluster element array including one or more cluster elements, each cluster element defined by one of one data element from the data element array or a plurality of continuous data elements from the data element array, wherein each cluster element is associated with a cluster code for determining the position of one or more data elements in the data element array, the cluster code correlating each data element defining the cluster element with the position of the data element in the data element array,
  wherein the cluster code of each cluster element is determined as a difference between a first data element associated with the cluster element and the position in the data element array where the first data element is stored, wherein the difference is calculated by subtracting the position in the data element array where the first data element is stored from the first data element; and
  wherein the data structure is associated with an increment value, and wherein two data elements adjacently positioned in the data element array are continuous if a subtraction of one of the two data elements adjacently positioned in the data element array from the other of the two data elements adjacently positioned in the data element array is equal to the increment value.

23. A computer system comprising:
  a memory configured according to a data structure, the data structure comprising:
    a data element array for storing a plurality of data elements, wherein each data element of the plurality of data elements comprises a key;
    an object array corresponding to the data element array, each position of the object array containing an object corresponding to a data element in the corresponding position in the data element array;
    a state array corresponding to the data element array, each position of the state array indicating whether a corresponding position in the data element array contains void data; and
    a cluster element array for storing one or more cluster elements, each cluster element defined by one of one data element from the data element array or a plurality of continuous data elements from the data element array, wherein each cluster element is associated with a cluster code correlating each data element defining the cluster element with the position of the data element in the data element array,
      wherein the cluster code of each cluster element is determined as a difference between a first data element associated with the cluster element and the position in the data element array where the first data element is stored, wherein the difference is calculated by subtracting the position in the data element array where the first data element is stored from the first data element associated with the cluster element, and wherein the data structure is associated with an increment value, and wherein two data elements adjacently positioned in the data element array are continuous if a subtraction of one of the two data elements adjacently positioned in the data element array from the other of the two data elements adjacently positioned in the data element array is equal to the increment value;

a request receiver coupled with the memory and operative to receive:
- requests to store data elements in the data structure;
- requests to search for data elements in the data structure; and
- requests to delete data elements from the data structure;

a memory manager coupled with the request receiver and operative to manage the data structure; and a data transmitter coupled with the memory manager and operative to transmit data responsive to a request received by the request receiver.

24. The computer system of claim 23, wherein the memory manager is operative to manage the data structure by, in response to a request received by the request receiver:

updating the cluster element array upon storing a data element in the data element array;

searching the data element array for a target data element by:
- upon determining that the cluster element array contains exactly one cluster element, determining the position of the target data element in the data element array based on a subtraction of the cluster code of the cluster element from the target data element; and
- upon determining that the cluster element array contains more than one cluster element:
  - searching through a sorted list of nodes to determine the cluster element defined by the target data element, each node associated with the cluster code of a cluster element in the cluster element array; and
  - determining the position of the target data element in the data element array based on a subtraction of the cluster code of the determined cluster element from the target data element; and deleting a target data element from the data structure by:
- upon determining that the cluster element array contains exactly one cluster element:
  - determining the position of the target data element in the data element array based on a subtraction of the cluster code of the cluster element from the target data element; and
  - setting the corresponding position in the state array as void; and
- upon determining that the cluster element array contains more than one cluster element:
  - searching through a sorted list of nodes, each node associated with the cluster code of a cluster element in the cluster element array, to determine the cluster element defined by the target data element;
  - determining the position of the target data element in the data element array based on a subtraction of the cluster code of the determined cluster element from the target data element; and
  - setting the corresponding position in the state array as void; and reclustering the cluster element array so that each cluster element in the cluster element array is defined by one of one data element from the data element array or a plurality of continuous non-void data elements from the data element array upon determining that a ratio of a number of positions in the data element array containing void data to a number of positions in the data element array containing non-void data exceeds a predetermined threshold.

25. The computer system of claim 24, wherein the memory manager is operative to manage the data structure by, in response to a request to search the data element array for a target data element received by the request receiver, access an object stored in the object array at the corresponding determined position; and wherein the data transmitter is operative to transmit the object in response to the request.

* * * * *